(12) United States Patent
Al-Sulaiman et al.

(10) Patent No.: US 9,643,102 B2
(45) Date of Patent: May 9, 2017

(54) HUMIDIFICATION-DEHUMIDIFACTION DESALINATION SYSTEM

(71) Applicant: KING FAHD UNIVERSITY OF PETROLEUM AND MINERALS, Dhahran (SA)

(72) Inventors: Fahad A. Al-Sulaiman, Dhahran (SA); Mohamed A. Antar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 379 days.

(21) Appl. No.: 14/297,518

(22) Filed: Jun. 5, 2014

(65) Prior Publication Data

US 2015/0353377 A1 Dec. 10, 2015

(51) Int. Cl.
*B01D 1/26* (2006.01)
*B01D 5/00* (2006.01)
(Continued)

(52) U.S. Cl.
CPC ............. *B01D 1/14* (2013.01); *B01D 1/26* (2013.01); *B01D 5/006* (2013.01); *C02F 1/043* (2013.01);
(Continued)

(58) Field of Classification Search
CPC .. B01D 1/14; B01D 1/26; B01D 5/006; C02F 1/041; C02F 1/043; C02F 1/048;
(Continued)

(56) References Cited

U.S. PATENT DOCUMENTS

| 489,147 A | * | 1/1893 | Golding | B01D 3/00 159/13.1 |
| 638,406 A | * | 12/1899 | Stone | B01D 3/22 159/13.1 |

(Continued)

FOREIGN PATENT DOCUMENTS

WO    WO 2007/128062    11/2007

OTHER PUBLICATIONS

M.J. Francis & R.M. Pashley, "Thermal desalination using a non-boiling bubble column", Desalination and Water Treatment, Vo. 12, Iss. 1-3, pp. 135-161 (2009) Abstract only.

(Continued)

*Primary Examiner* — Charles Bushey
(74) *Attorney, Agent, or Firm* — Richard C. Litman

(57) ABSTRACT

The humidification-dehumidification desalination system includes a humidifier, a dehumidifier, and a carrier gas that is humidified in the humidifier and condensed in the dehumidifier to produce purified water. The humidifier preferably includes multiple stages in a staircase configuration in which at least one stage has a perforated or porous plate and the carrier gas is bubbled through the bottom of the plate into the "liquid to be purified" atop the plate. The dehumidifier may also include multiple stages in a staircase configuration in which at least one stage has a perforated or porous plate and the carrier gas is bubbled through the bottom of the plate into the purified liquid atop the plate. In both the humidifier and the dehumidifier, the liquid travels downward from one stage to the next stage. The system may be operated in a closed loop, so that the carrier gas is recirculated from the dehumidifier to the humidifier.

28 Claims, 20 Drawing Sheets

(51) Int. Cl.
*B01D 1/14* (2006.01)
*C02F 1/14* (2006.01)
*C02F 103/08* (2006.01)
*C02F 101/32* (2006.01)
*C02F 103/10* (2006.01)
*C02F 1/04* (2006.01)

(52) U.S. Cl.
CPC ............. *C02F 1/048* (2013.01); *C02F 1/14* (2013.01); *C02F 1/041* (2013.01); *C02F 2101/32* (2013.01); *C02F 2103/08* (2013.01); *C02F 2103/10* (2013.01); *C02F 2209/40* (2013.01); *Y02W 10/37* (2015.05)

(58) Field of Classification Search
CPC .... C02F 1/14; C02F 2101/32; C02F 2103/08; C02F 2103/10; C02F 2209/40; Y02W 10/37
USPC ................. 261/114.1, 114.3, 114.5
See application file for complete search history.

(56) References Cited

U.S. PATENT DOCUMENTS

| | | | | |
|---|---|---|---|---|
| 2,645,467 A * | 7/1953 | Rupp | ............. | B01D 3/24 159/13.4 |
| 2,678,201 A * | 5/1954 | Koch | ............. | B01D 3/16 202/158 |
| 2,681,219 A * | 6/1954 | Thrift | ............. | B01D 3/16 261/114.1 |
| 3,807,143 A * | 4/1974 | Dunn | ............. | B01D 47/021 261/114.1 |
| 4,270,981 A * | 6/1981 | Stark | ............. | C02F 1/14 126/635 |
| 4,363,703 A | 12/1982 | ElDifrawi et al. | | |
| 5,641,338 A * | 6/1997 | Brookman | ............. | B01D 47/021 261/114.1 |
| 6,607,639 B1 | 8/2003 | Longer | | |
| 6,923,852 B2 * | 8/2005 | Vrotsos | ............. | B01D 53/504 261/113 |
| 7,494,572 B2 | 2/2009 | Tonkin et al. | | |
| 8,083,902 B2 * | 12/2011 | Al-Garni | ............. | B01D 1/0035 159/14 |
| 9,120,033 B2 * | 9/2015 | Govindan | ............. | B01D 1/14 |
| 9,289,696 B2 * | 3/2016 | Al-Garni | ............. | F24J 3/081 |
| 2010/0314238 A1 | 12/2010 | Frolov et al. | | |
| 2011/0056822 A1 | 3/2011 | Elsharqawy et al. | | |
| 2011/0079504 A1 | 4/2011 | Govindan et al. | | |
| 2013/0015051 A1 | 1/2013 | Elsharqawy et al. | | |
| 2013/0074694 A1 | 3/2013 | Govindan et al. | | |
| 2013/0146437 A1 | 6/2013 | Maurer et al. | | |
| 2013/0168224 A1 | 7/2013 | Godshall | | |
| 2013/0341810 A1 | 12/2013 | Govindan et al. | | |

OTHER PUBLICATIONS

A.E. Kabeel et al., "Water Desalination Using a Humidification-Dehumidification Technique—A Detailed Review", Natural Resources (2013), vol. 4, pp. 286-305.

* cited by examiner

HUMIDIFICATION-DEHUMIDIFACTION DESALINATION SYSTEM

BACKGROUND OF THE INVENTION

1. Field of the Invention

The present invention relates to desalination and distillation systems, and particularly to a humidification-dehumidification desalination system that may be used for desalination of seawater, for removal of brine from oilfield deposits during pumping and refining, for separation of mixtures of oil and water, and various other uses where it is desired to purify water or separate mixtures.

2. Description of the Related Art

In many areas of the world, fresh water is scarce, but seawater or salt water is abundant. This has led to the development of various desalination systems to remove salts, primarily sodium chloride, from seawater or salt water, both for drinking water and to produce less corrosive water for industrial use.

Conventional distillation with a single heating stage and a single condensation stage is not energy efficient and is cost prohibitive. As a result, various desalination technologies have been developed. One widely used desalination technology is multi-stage flash (MSF) distillation, in which vapor is produced by the sudden inrush of seawater or bring into an evacuated chamber (flashing), followed by condensation of the vapor to obtain fresh water, a process that is repeated sequentially in multiple stages or chambers. Another widely used desalination technology is reverse osmosis (RO), in which pumps are used to drive the seawater or bring feed through a selectively permeable ion exchange membrane. Several other processes are known, including electrodialysis, thermal vapor compression, liquid-liquid extraction, etc. However, each of these processes is expensive, and they each have technical limitations.

More recently, there has been interest in humidification-dehumidification desalination technology, in which a carrier gas is humidified with the seawater or brine, and then dehumidified to obtain fresh water. Such systems are small-scale distillation systems that may make use of solar energy during the humidification stage. Such systems are usually more economical than other desalination technologies, but are less energy efficient. There is a continuing need for improvements in humidification-dehumidification systems to increase energy efficiency, reduce costs, and increase productivity.

Thus, a humidification-dehumidification desalination system solving the aforementioned problems is desired.

SUMMARY OF THE INVENTION

The humidification-dehumidification desalination system includes a humidifier, a dehumidifier, and a carrier gas that is humidified in the humidifier and condensed in the dehumidifier to produce purified water. The humidifier preferably includes multiple stages in a staircase configuration in which at least one stage has a perforated or porous plate and the carrier gas is bubbled through the bottom of the plate into the "liquid to be purified" atop the plate. The dehumidifier may also include multiple stages in a staircase configuration in which at least one stage has a perforated or porous plate and the carrier gas is bubbled through the bottom of the plate into the purified liquid atop the plate. In both the humidifier and the dehumidifier, the liquid travels downward from one stage to the next stage. The system may be operated in a closed loop, so that the carrier gas is recirculated from the dehumidifier to the humidifier.

Both the humidifier and the dehumidifier have at least one liquid inlet, at least one liquid outlet, a carrier gas inlet, and a carrier gas outlet. In addition, the dehumidifier has at least one purified liquid outlet. The humidifier may also optionally include a packed-bed or spray system in addition to the bubble column to enhance evaporation of the liquid being purified. The humidifier and the dehumidifier are thermally separated, without a common wall for heat exchange. The humidifier and the dehumidifier are each modular units, so that each may be used separately in different applications to enhance the utility of the system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
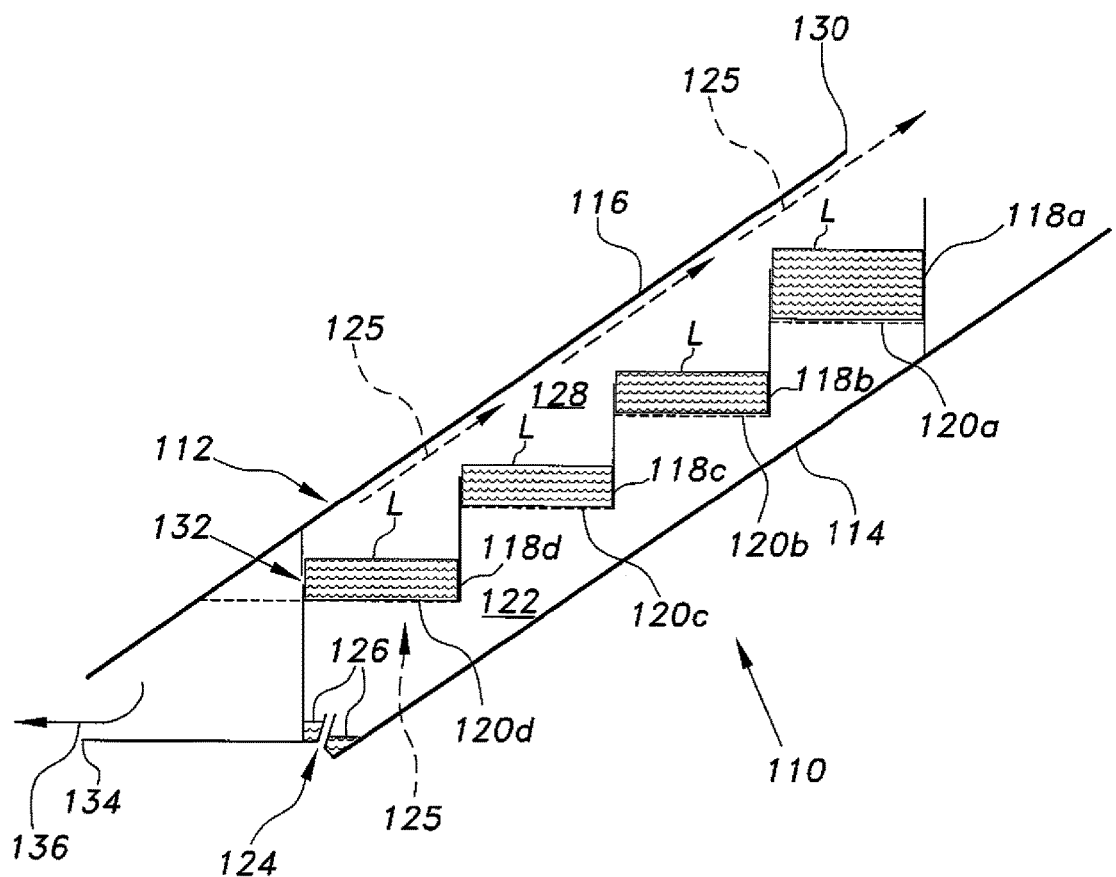
FIG. 1 is a schematic side elevation view of a humidifier for a humidification-dehumidification desalination system according to the present invention.

The humidification-dehumidification desalination system includes a humidifier, a dehumidifier, and a carrier gas that is humidified in the humidifier and condensed in the dehumidifier to produce purified water. The humidifier preferably includes multiple stages in a staircase configuration in which at least one stage has a perforated or porous plate and the carrier gas is bubbled through the bottom of the plate into the "liquid to be purified" atop the plate. The dehumidifier may also include multiple stages in a staircase configuration in which at least one stage has a perforated or porous plate and the carrier gas is bubbled through the bottom of the plate into the purified liquid atop the plate. In both the humidifier and the dehumidifier, the liquid travels downward from one stage to the next stage. The system may be operated in a closed loop, so that the carrier gas and/or the liquid to be purified are recirculated from the dehumidifier to the humidifier.

Both the humidifier and the dehumidifier have at least one liquid inlet, at least one liquid outlet, a carrier gas inlet, and a carrier gas outlet. In addition, the dehumidifier has at least one purified liquid outlet. The humidifier may also optionally include a packed-bed or spray system in addition to the bubble column to enhance evaporation of the liquid being purified. The humidifier and the dehumidifier are thermally separated, without a common wall for heat exchange. The humidifier and the dehumidifier are each modular units, so that each may be used separately in different applications to enhance the utility of the system. The humidified gas normally flows from the gas outlet of the humidifier to the gas inlet of the dehumidifier through a conduit, which may include one or more valves for flow control, but may also include a compressor for pressurizing the dehumidifier. The reference numerals used to define the components of each of the systems described herein are identical in their last two digits for corresponding components in each of the embodiments. The first digit (or digits, for four digit reference numerals) is the same as the number of the corresponding embodiment and Figure of the drawings.

FIG. 1 provides a schematic side elevation view of a humidifier 110 for the humidification-dehumidification (HDH) desalination system. The humidifier 110 has a sloped housing 112 for the containment of one or more liquid trays therein. The housing 112 has a sloped floor 114 and sloped roof or ceiling 116. Alternatively, the floor 114 may be horizontal, while the roof or ceiling 116 is inclined or sloped. An array of successively stepped liquid-containment trays 118a through 118d is installed within the housing 112. Overflow from the first or uppermost tray 118a spills into the next lower tray 118b, overflow from tray 118b flows into tray 118c, and overflow from tray 118c flows into the lowermost tray 118d. It will be seen that more or fewer trays may be provided, as desired. The roof or ceiling 116 of the housing 112 may comprise a transparent sheet of material, e.g., glass, acrylic, polycarbonate, etc., to allow insolation (exposure to sunlight) and warming of the trays 118a-118d, and particularly the liquid L therein, to enhance the evaporation of liquid L therefrom (it will be understood that the liquid L is the liquid to be purified, e.g., brine of seawater). Also, the roof or ceiling may have Fresnel lenses to concentrate solar radiation in order to heat the carrier gas as it is being humidified.

Each of the trays 118a through 118d has a porous floor or bottom surface, respectively 120a through 120d, which may be formed by a sieve plate, a wheel-type sparger and/or radial, ring, or spider sparger, a floor having metal sparger tubes incorporated therein, or a perforated plate. The openings in each of the tray floors 120a-120d are relatively small, and are sized to prevent the flow of liquid downward therethrough when air (or other gas) is provided below the trays 118a-118d with sufficient pressure. Both the size of the openings in the tray floors 120a-120d and the spacing between the openings may be the same or different. The air or gas pressure may be adjusted, depending upon the pressure head(s) of the liquid in the trays 118a-118d, in order to prevent liquid flow through the porous tray floors 120a-120d. Air or other carrier gas (the carrier gas may be air, hydrogen, helium, or carbon dioxide) enters the inlet side or chamber 122 of the housing 112 below the trays 118a through 118d through an air or gas inlet 124 below the lowermost tray floor 120d, and percolates upward through the porous tray bottoms 120a through 120d and the liquid L therein. One or more liquid catch trays 126 may be provided in the lowermost part of the inlet chamber 122 adjacent the air or gas inlet 124 to capture any liquid that may happen to flow through the porous tray floors 120a through 120d to flow down the sloped floor 114 of the housing 112. Any liquid captured by the catch trays 126 may be drained off for recycling or disposal.

It will be seen that the bubble column humidifier 110 is a direct contact humidifier. This technique results in substantially higher heat and mass transfer coefficients compared to indirect heat exchangers.

The air or gas absorbs liquid L from each of the trays 118a through 118d as it percolates through the liquid, and the air or gas bubbles from the upper surface of the liquid L to flow into the upper side or chamber 128 of the housing 112 above the trays. The humidified gas then flows upward in the outlet chamber 128 to exit the humidifier system 110 at the air or gas outlet 130 at the upper end of the device (as shown by the dashed arrows 125), where it may enter a conduit for transfer to a dehumidifier. The air or gas outlet 130 may also serve as the inlet for the introduction of additional liquid to the uppermost tray 118a to replace liquid lost due to evaporation during the operation of the system 110, although separate ports or conduits may be used for gas exit and liquid inlet. Liquid cascades from the uppermost tray 118*a* into each successively lower tray 118*b*, 118*c*, and 118*d*, as described further above. Any surplus liquid in the lowermost tray 118*d* flows from that tray through a valved passage 132 below the upper level of the liquid L to prevent air or gas in the outlet side or chamber 128 from escaping with the overflow liquid. The liquid L in excess of that which the lowermost tray 118*d* is capable of holding will flow through the outlet 132 and thence from the system 110 through the liquid outlet opening 134 (as shown by the arrow 136). The height of the liquid L in any of the trays 118*a* through 118*d* may be adjusted to optimize the performance of the system, depending upon conditions, i.e., identical or different liquid depths may be provided in the various trays 118*a*-118*d*. In the event that there is less demand for purified liquid, one or more of the trays (stages) may be removed operationally from the system by blocking airflow through the given tray(s) or by other means. This operational removal of one or more trays from the system may also be done in the event that there is insufficient energy (e.g., solar, etc.) to operate the entire system efficiently.

Figure 2:
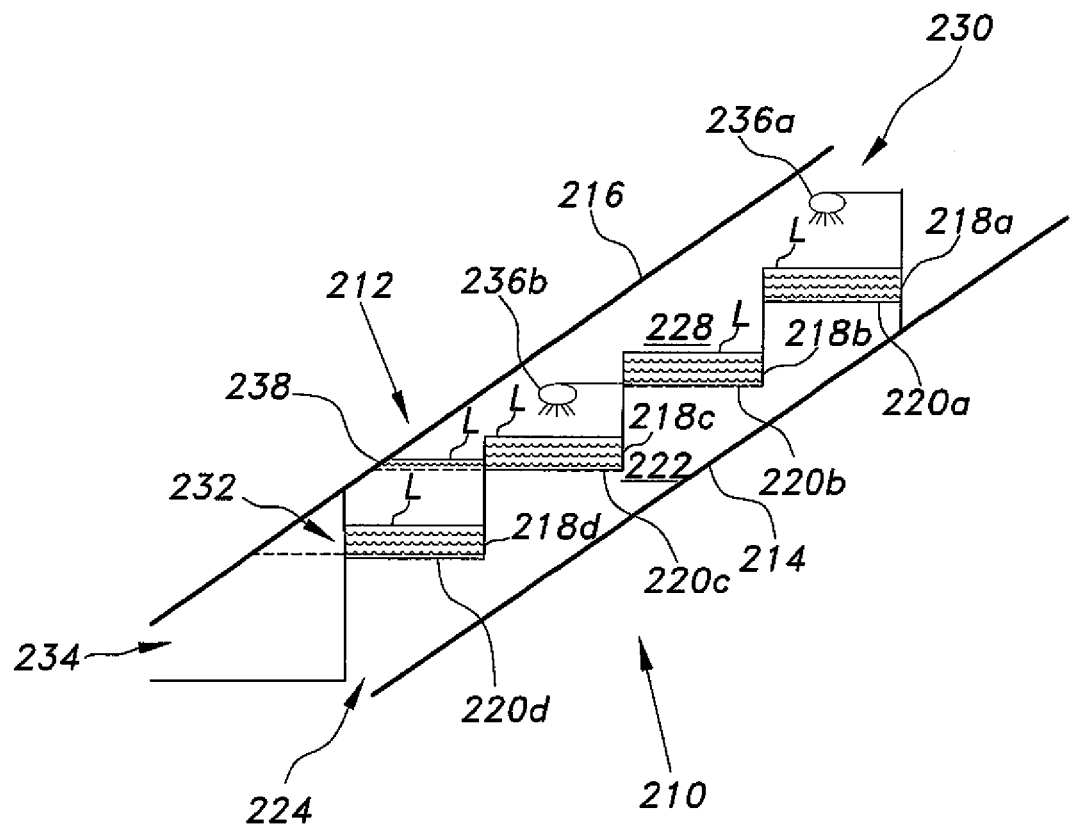
FIG. 2 is a schematic side elevation view of the humidifier of FIG. 1, shown with the addition of a sprayer system to enhance humidification.

FIG. 2 provides a schematic side elevation view of a humidifier 210 of the humidification-dehumidification desalination system substantially the same as humidifier 110, but having a spray system to enhance humidification. The system 210 is similar to the system 110 of FIG. 1, having a sloped housing 212, a sloped floor 214, a sloped roof or ceiling 216, and liquid containment trays 218*a* through 218*d* having porous floors or bottom surfaces 220*a* through 220*d*, respectively. The housing 212 is divided into a lower inlet side or chamber 222 having an air or gas inlet 224 and an opposite upper outlet side or chamber 228 by the array of trays 218*a* through 218*d*, the outlet side 228 having an air or gas outlet and liquid inlet 230 at its upper end. Excess liquid L escapes from the lowermost tray 218*d* through the passage 232 therein, to flow from the humidifier 210 through the liquid drain or outlet opening 234. The humidifier 210 functions substantially as described above for the humidifier 110 illustrated in FIG. 1 of the drawings.

However, it will be seen that the humidifier 210 of FIG. 2 includes certain additional components not present in the humidifier 110 of FIG. 1. The humidifier 210 includes first and second sprayers 236*a* and 236*b* positioned above two of the trays, e.g., trays 218*a* and 218*c*, to provide further humidification of the air or other gas flowing from the liquid L in the trays and into the upper or outlet chamber 228. One or more such sprayers may be installed above one or more of the trays, or all of the trays, as desired. An additional sprayer(s) may be installed at the upper exit of the system, immediately past the uppermost tray and immediately before the gas departs the system. Also, it will be noted that the lowermost tray 218*d* has a secondary tray 238 positioned thereabove. The secondary tray 238 has a configuration much like that of the other trays 218*a* through 218*d* with their porous floors. The secondary tray 238 provides another liquid container through which the air or gas may percolate, without increasing the liquid pressure head that would otherwise occur if all of the liquid contained in the trays 218*d* and 238 were contained within a single container tray. This allows the inlet gas pressure to be reduced. It will be seen that while only a single secondary tray 238 is shown over the lowermost tray 218*d* in the humidifier 210 of FIG. 2, additional secondary trays may be provided over some, or all, of the other primary trays 218*a* through 218*c* as desired. These tray arrays need not be limited to only a lower tray and an upper tray. Additional trays may be provided in a vertical array for one or more of the tray assemblies in the cascade, as desired. Further, means may be provided (e.g., bypass pipes or ducts, etc.) to bypass one or more of the trays in each vertical array of multiple trays, where installed.

Figure 3:
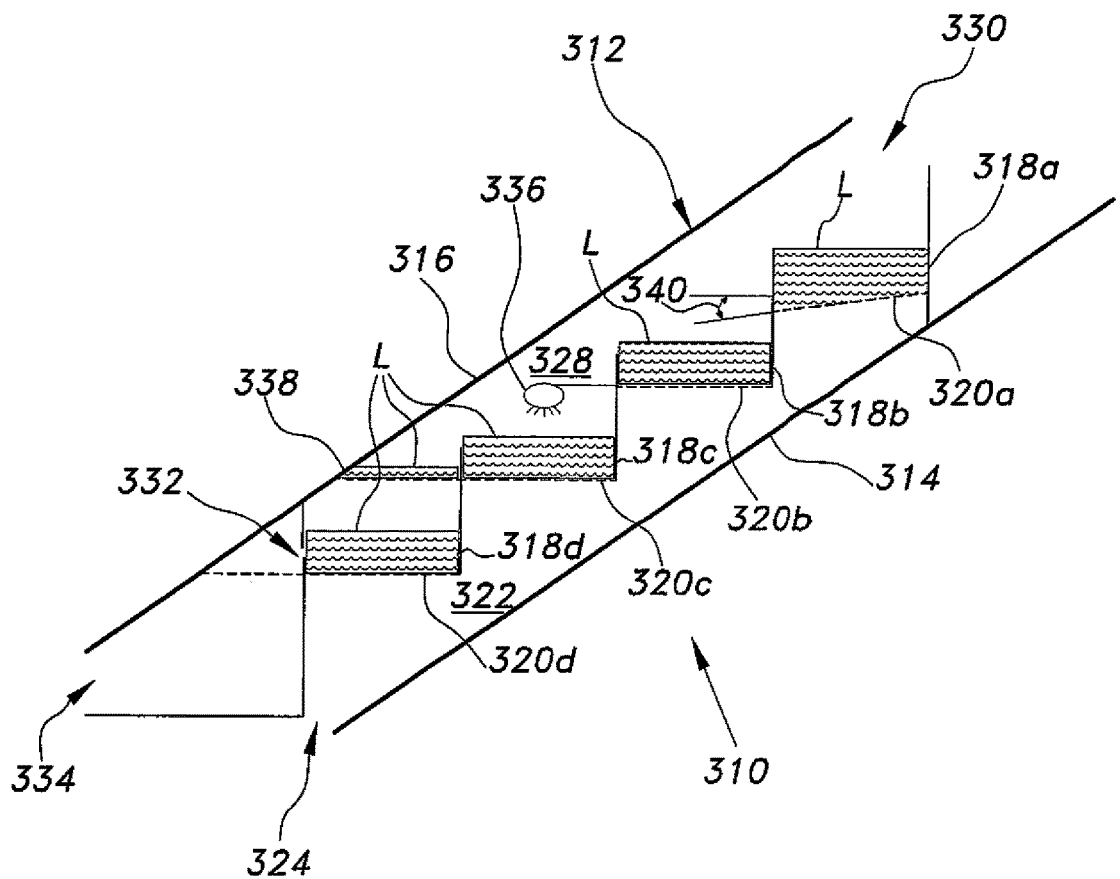
FIG. 3 is a schematic side elevation view of the humidifier of FIG. 1, shown with the perforated plate of the upper stage inclined.

FIG. 3 provides a schematic side elevation view of a humidifier 310 of the humidification-dehumidification desalination system substantially the same as humidifier 210, but having the perforated or porous plate of the upper stage inclined. The humidifier 310 is similar to the humidifiers 110 and 210 respectively of FIGS. 1 and 2, having a sloped housing 312, a sloped floor 314, a sloped roof or ceiling 316, and liquid containment trays 318*a* through 318*d* having porous floors or bottom surfaces 320*a* through 320*d*, respectively. The housing 312 is divided into a lower inlet side or chamber 322 having an air or gas inlet 324 and an opposite upper outlet side or chamber 328 by the array of trays 318*a* through 318*d*, the outlet side 328 having an air or gas outlet and liquid inlet 330 at its upper end. Excess liquid L escapes from the lowermost tray 318*d* through the passage 332 therein to flow from the humidifier 310 through the liquid drain or outlet opening 334. A sprayer 336 is positioned above one of the trays, e.g., tray 318*c*, and a secondary tray 338 is positioned above the lowermost tray 320*d*. The humidifier 310 functions substantially as described above for the humidifier 110 illustrated in FIG. 1 of the drawings, with the additions of the sprayer(s) and secondary tray(s) as described in the discussion of the humidifier 210 of FIG. 2. Additional sprayers may be installed above any of the trays 318*a*-318*d*, if desired, and additional trays may be arranged in each vertical array, as described for the humidifier 210 of FIG. 2.

The humidifier 310 differs from the humidifier 110 and humidifier 210 in that the floor 320*a* of the first or uppermost liquid containment tray 318*a* is sloped toward the successively lower trays, as shown by the slope 340. This slope assists in the collection of contaminants and/or sediment that would otherwise collect over the entire surface of the floor 320*a* and might tend to block the pores in the porous floor. Any or all of the various liquid containment trays may be equipped with such a sloped floor. The floor may be permanently installed with such a slope, or the system 310 may be constructed to have a manually or automatically actuated mechanism to tilt or slope the floor periodically.

Figure 4:
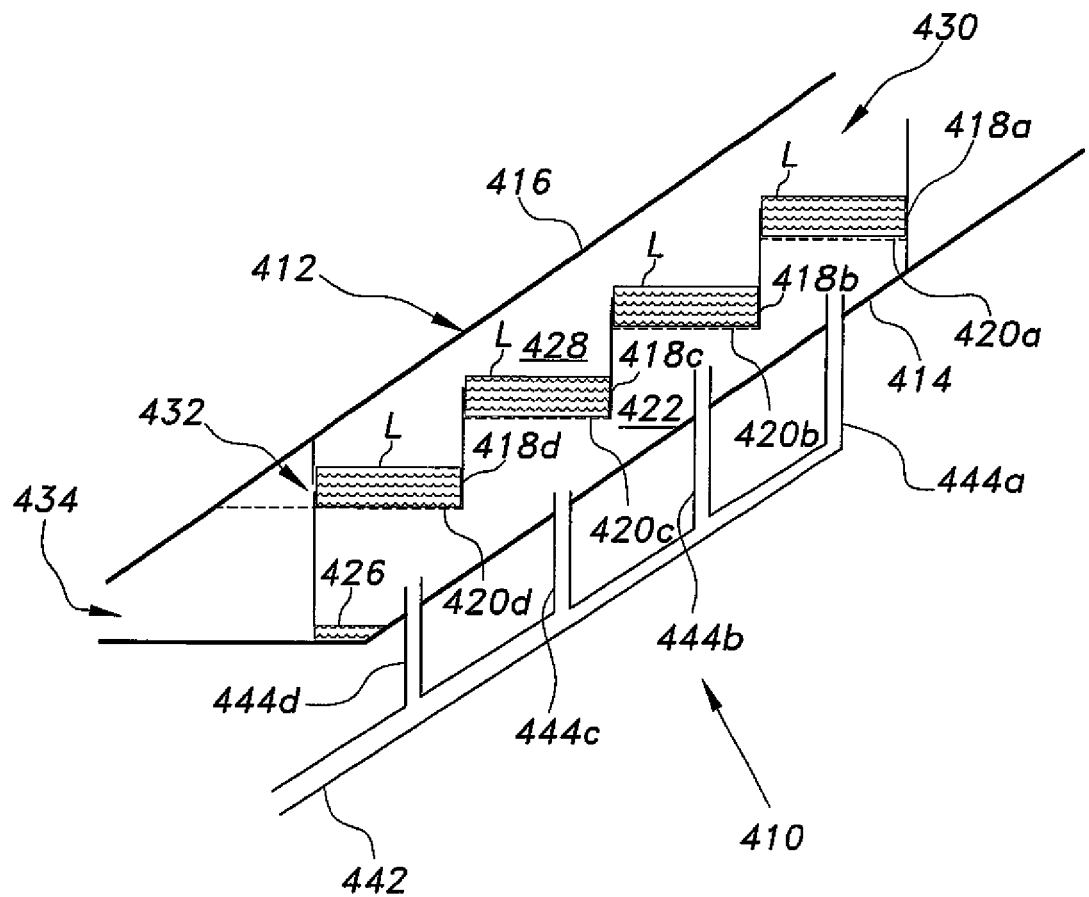
FIG. 4 is a schematic side elevation view of the humidifier of FIG. 1, shown with the addition of a carrier gas plenum.

FIG. 4 provides a schematic side elevation view of a humidifier 410 of the humidification-dehumidification desalination system substantially the same as humidifier 110, but with the addition of a carrier gas plenum. The humidifier 410 is similar to the humidifier 110 of FIG. 1, having a sloped housing 412, a sloped floor 414, a sloped roof or ceiling 416, and liquid containment trays 418*a* through 418*d* having porous floors or bottom surfaces 420*a* through 420*d*, respectively. The housing 412 is divided into a lower inlet side or chamber 422 and an opposite upper outlet side or chamber 428 by the array of trays 418*a* through 418*d*. The outlet side 428 has an air or gas outlet and liquid inlet 430 at its upper end. One or more liquid catch trays 426 may be provided in the lowermost part of the inlet chamber 422, as in the humidifier 110 of FIG. 1. This feature may be provided in humidifiers 210 and 310 as well. Excess liquid L escapes from the lowermost tray 418*d* through the passage 432 therein to flow from the humidifier 410 through the liquid drain or outlet opening 434.

The humidifier 410 functions substantially as described above for the humidifier 110 illustrated in FIG. 1 of the drawings, except for the means for introducing air or other gas to the lower or inlet side 422 of the housing 412. In the humidifier 410 of FIG. 4, an air or gas distribution manifold 442 is provided beneath the housing 412. The manifold 442 has a series of air or gas outlets 444a, 444b, 444c, and 444d extending upward through the floor 414 of the housing 412. Each of these outlets 444a-444d preferably terminates beneath a corresponding liquid tray, e.g., the first or uppermost outlet nozzle 444a is positioned beneath the floor 420a of the first or uppermost tray 418a, etc. In this configuration, there is no single air or gas inlet at the base of the lower chamber, as in the inlet 124 of the lower chamber 122 of the humidifier 110 of FIG. 1. Rather, the air or gas to be humidified is introduced into the manifold 442, from which it flows through the four outlets 444a through 444d to percolate upward through the liquid L in the corresponding liquid trays 418a through 418d. The humidifier 410 may also include the sprayer systems of FIGS. 2 and 3 and the sloped floor and vertically stacked trays of FIG. 3, if desired.

Figure 5:
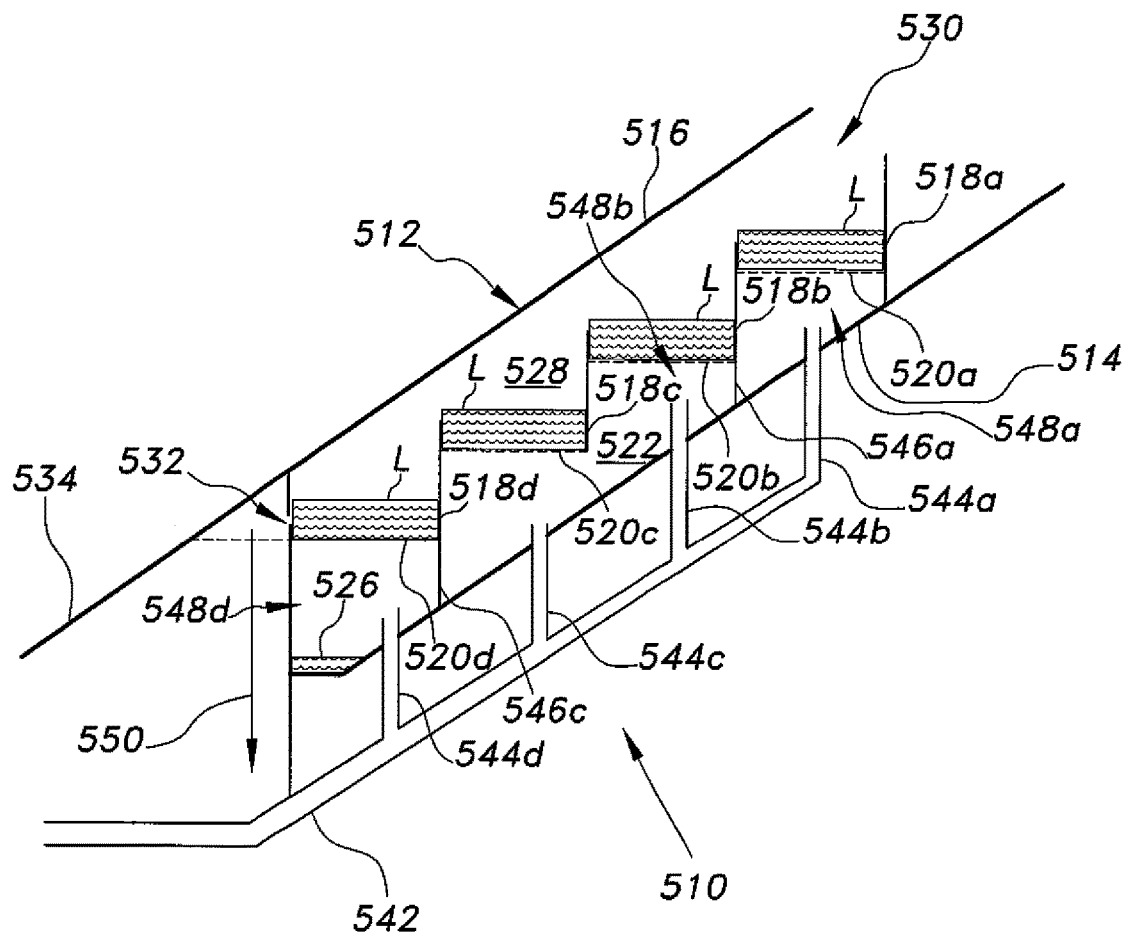
FIG. 5 is a schematic side elevation view of the humidifier of FIG. 1, shown with carrier gas preheating.

FIG. 5 provides a schematic side elevation view of a humidifier 510 of a humidification-dehumidification desalination system substantially the same as humidifier 410, but with the addition of means for preheating the carrier gas. The humidifier 510 is similar to the humidifier 410 of FIG. 4, having a sloped housing 512, a sloped floor 514, a sloped roof or ceiling 516, and liquid containment trays 518a through 518d having porous floors or bottom surfaces 520a through 520d, respectively. The housing 512 is divided into a lower inlet side or chamber 522 and an opposite upper outlet side or chamber 528 by the array of trays 518a through 518d, the outlet side 528 having an air or gas outlet and liquid inlet 530 at its upper end. One or more liquid catch trays 526 may be provided in the lowermost part of the inlet chamber 522, as in the humidifier 410 of FIG. 4. This feature may be provided in humidifiers 210, 310, and 410 as well. Excess liquid L escapes from the lowermost tray 518d through the passage 532 therein to flow from the humidifier 510 through the liquid drain or outlet opening 534.

The humidifier 510 also includes an air or gas inlet manifold 542 having air or gas outlet nozzles 544a through 544c extending therefrom, and functions substantially as described above for the humidifier 410 illustrated in FIG. 4 of the drawings. However, in FIG. 5, a portion of the gas inlet manifold 542 passes through the liquid drain chamber so that the carrier gas is preheated by the brine or other liquid L being purified, the excess heated brine falling from the lowermost tray 518d into the drain chamber through which the gas manifold 542 passes, as shown by the arrow 550. The brine or other liquid L may be heated by solar heating through transparent panels in the roof or ceiling 516, or may be heated by an electric heater or other means before being introduced through the liquid inlet 530.

FIG. 5 also shows the optional addition of vertical walls below the tray 518a at the lower end of the tray 518a and below tray 518d at the upper end of the tray 518d. This illustrates that the space below some or all of the trays may be a common space so that the gas may be distributed to any one of several trays, or the space below some or all of the trays may be separated from the space below adjacent trays by partition walls or baffles, so that the gas injected by the nozzles is restricted to bubbling through a single column. Thus, the inlet chamber 422 of FIG. 4 includes a single relatively large volume beneath the liquid trays 418a through 418d. In contrast, the humidifier 510 of FIG. 5 includes walls 546a and 546c to define three separate inlet chambers 548a, 548b and 548d, chamber 548a being beneath tray 518a, chamber 548b being beneath trays 518b and 518c, and chamber 548d being beneath tray 518d. Each of the gas outlet nozzles or tubes 544a through 544d communicates with the corresponding chamber(s) 548a through 548d to provide more precise control over the air or gas flow.

Figure 6:
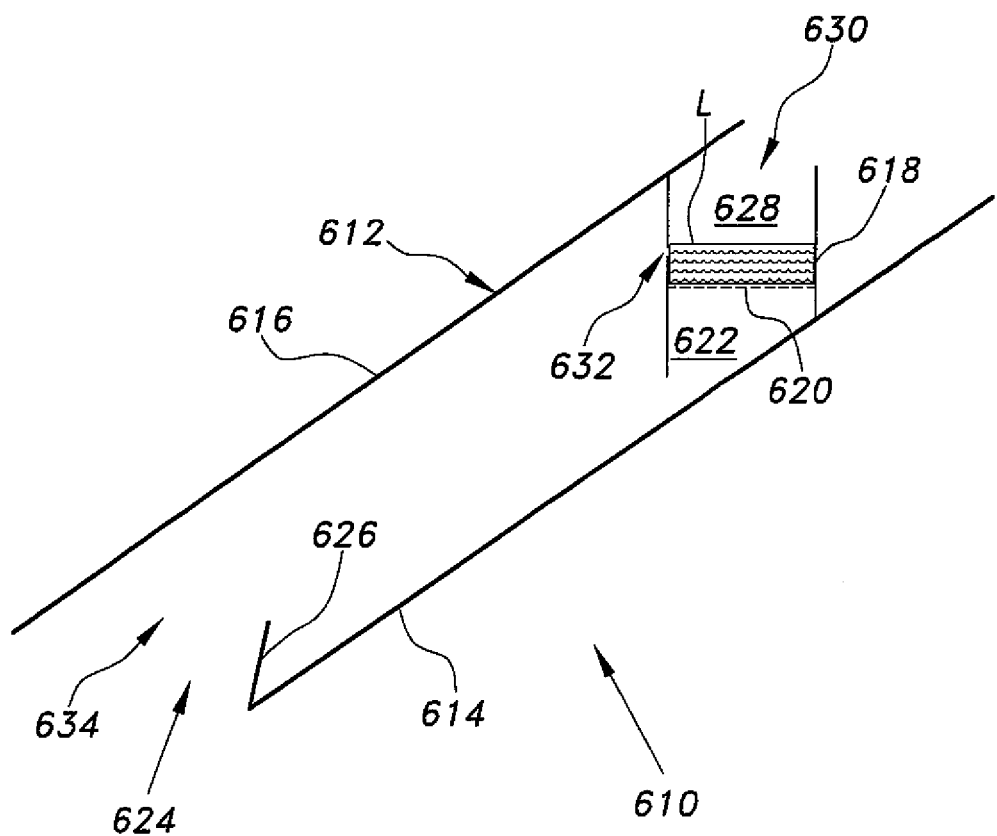
FIG. 6 is a schematic side elevation view of a humidifier for a humidification-dehumidification desalination system according to the present invention having only a single bubble vapor mechanism stage.

FIG. 6 provides a schematic side elevation view of a humidifier 610 of the humidification-dehumidification desalination system. The humidifier 610 is similar to the humidifier 110 of FIG. 1, having a sloped housing 612, a sloped floor 614, and a sloped roof or ceiling 616. However, the humidifier 610 of FIG. 6 has only a single liquid containment tray 618 having a porous floor or bottom surface 620, rather than the plurality trays shown in FIGS. 1 through 5. The housing 612 is divided by the single tray 618 into a lower inlet side or chamber 622 (beneath the single liquid tray 618); and has an air or gas inlet 624 and an opposite upper outlet side or chamber 628 above the single trays 618, the outlet side 628 having an air or gas outlet and liquid inlet 630 at its upper end. Excess liquid L escapes from the tray 618 through the passage 632 therein to flow from the humidifier 610 through the liquid drain or outlet opening 634. A liquid catch tray 626 may be provided in the lowermost part of the inlet chamber 622 adjacent the air or gas inlet 624 to capture any liquid that may flow through the porous floor 620 of the tray 618 and back into the chamber 622. The system 610 functions substantially as described above for the humidifier 110 illustrated in FIG. 1 of the drawings, but has only the single liquid containment tray 618, rather than a plurality of trays. The carrier gas may be heated, e.g., by solar heating through a transparent panel in the roof or ceiling 616.

Figure 7:
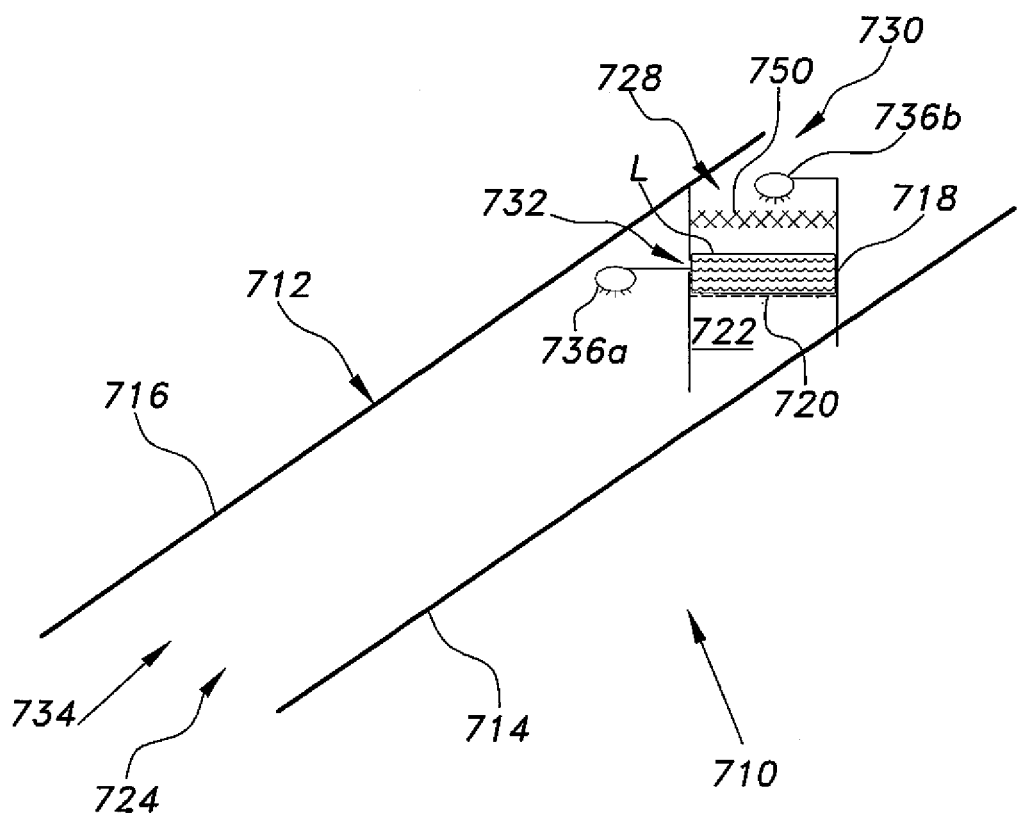
FIG. 7 is a schematic side elevation view of the humidifier of FIG. 6, shown with the addition of a sprayer system and a packed bed to enhance humidification.

FIG. 7 provides a schematic side elevation view of a humidifier 710 for a humidification-dehumidification desalination system substantially the same as humidifier 610, but with the addition of a sprayer system and a packed bed to enhance humidification. The humidifier 710 is similar to the single tray humidifier 610 of FIG. 6, having a sloped housing 712, a sloped floor 714, a sloped roof or ceiling 716, and a single liquid containment tray 718 having a porous floor or bottom surface 720. The housing 712 is divided by the single tray 718 into a lower inlet side or chamber 722 (beneath the single liquid tray 718) having an air or gas inlet 724 and an opposite upper outlet side or chamber 728 above the single tray 718, the outlet side 728 having an air or gas outlet and liquid inlet 730 at its upper end. Excess liquid L escapes from the tray 718 through the passage 732 therein to flow from the humidifier 710 through the liquid drain or outlet opening 734.

The single tray humidifier 710 of FIG. 7 differs from the single tray humidifier 610 of FIG. 6, in that the humidifier 710 includes certain additional features not found in the humidifier 610. The humidifier 710 includes a first sprayer 736a disposed in the housing 712 to the immediate downstream side of the tray 718, and a second sprayer 736b disposed above the single liquid containment tray 718. The first sprayer 736a is positioned to add liquid vapor to the incoming air or gas immediately before it flows into the inlet side 722 of the housing 712 and percolates through the liquid L in the tray 718, while the second sprayer 736b is positioned to further humidify the air or gas flowing upward from the tray 718 after percolating therethrough. Further humidification of the air or gas is provided by a packing bed 750 of porous material, e.g., porous and/or shredded plastic material, such as polyvinyl chloride (PVC), metal screening, and/or other porous materials, disposed above the tray. The packing bed 750 is saturated with liquid so that the air or gas absorbs some of that liquid as it passes through the packing bed 750 after flowing through the liquid tray 718. The humidifier 710 functions substantially as described above for the humidifier 610 illustrated in FIG. 6 of the drawings, but adds the additional humidifying sprayer and packing bed components to the humidifier 710.

Figure 8:
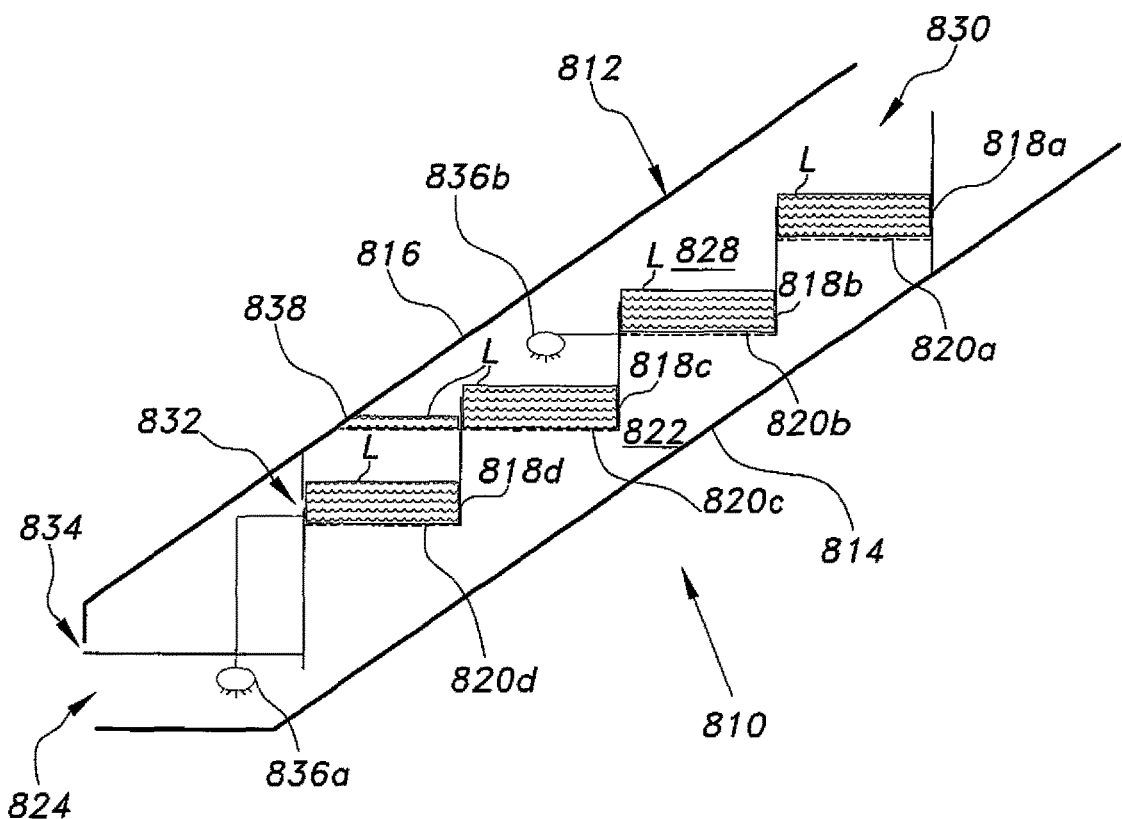
FIG. 8 is a schematic side elevation view of the humidifier of FIG. 1, shown with the addition of a sprayer at the carrier gas inlet.

FIG. 8 provides a schematic side elevation view of a humidifier 810 of a humidification-dehumidification desalination system substantially the same as humidifier 210 of FIG. 2, but with the addition of a sprayer at the carrier gas inlet. The humidifier 810 is most similar to the system 210 FIG. 2, having a sloped housing 812, a sloped floor 814, a sloped roof or ceiling 816, and liquid containment trays 818a through 818d having porous floors or bottom surfaces 820a through 820d, respectively. The housing 812 is divided into a lower inlet side or chamber 822 having an air or gas inlet 824, and an opposite upper outlet side or chamber 828 by the array of trays 818a through 818d, the outlet side 828 having an air or gas outlet and liquid inlet 830 at its upper end. Excess liquid L escapes from the lowermost tray 818d through the passage 832 therein to flow from the humidifier 810 through the liquid drain or outlet opening 834. A first sprayer 836a is disposed in the housing 812 immediately inside the air or gas inlet 824, and a second sprayer 836b is disposed above one of the liquid containment trays, e.g., the tray 818c. These two sprayers operate to humidify the air or gas as it enters the inlet chamber 822 (first sprayer 836a), and to further humidify the air or gas after it has passed through the liquid tray (second sprayer 836b). Also, a secondary tray 838 is positioned above the lowermost tray 820d to further humidify the air or gas (it will be understood that the secondary tray 838 can be over one or more of the trays 820a through 820d). The humidifier 810 functions substantially as described above for the humidifier 210 illustrated in FIG. 2 of the drawings.

Figure 9:
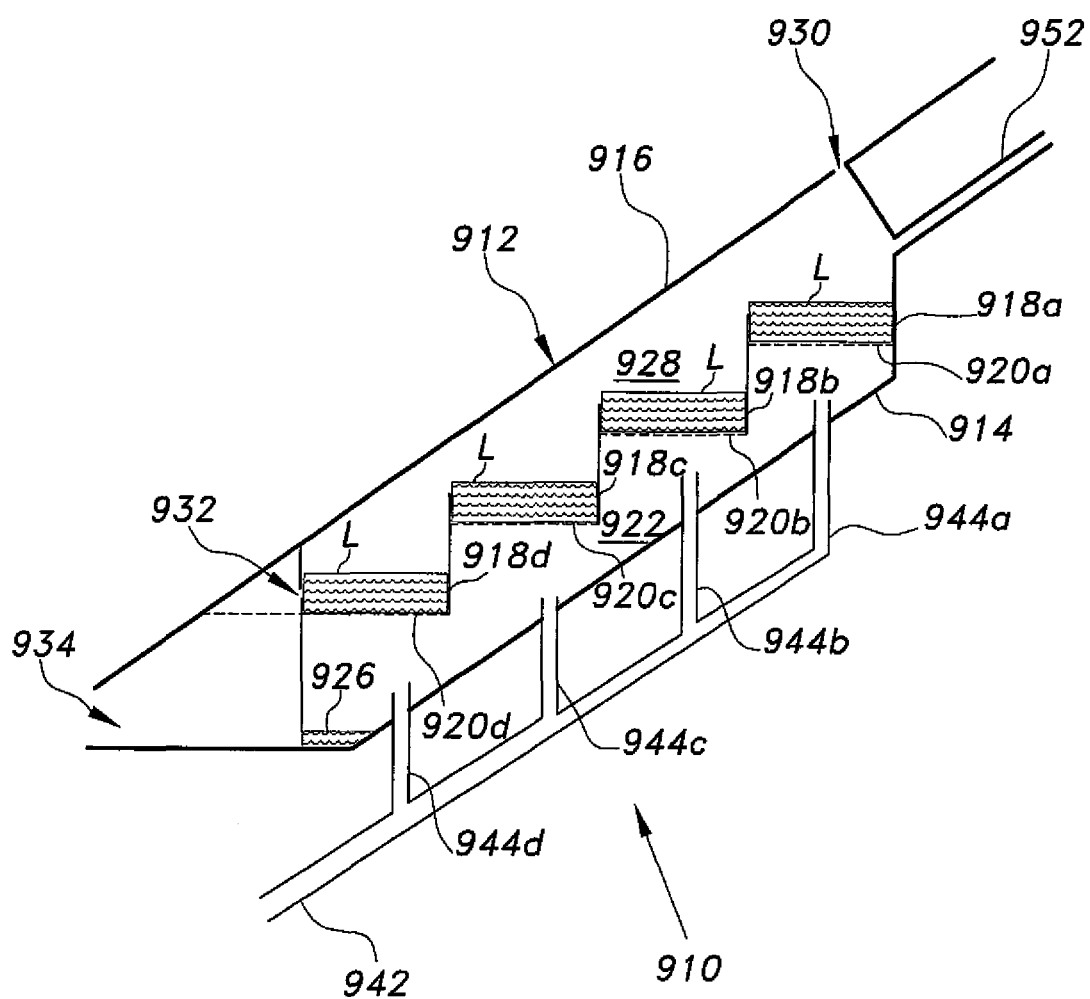
FIG. 9 is a schematic side elevation view of the humidifier of FIG. 1, shown with the addition of a duct for preheating liquid to be purified.

FIG. 9 provides a schematic side elevation view of a humidifier 910 of a humidification-dehumidification desalination system substantially the same as humidifier 410 of FIG. 4, but with the addition of a duct for preheating liquid to be purified. The humidifier 910 is similar to the system 410 of FIG. 4, having a sloped housing 912, a sloped floor 914, a sloped roof or ceiling 916, and liquid containment trays 918a through 918d having porous floors or bottom surfaces 920a through 920d, respectively. The housing 912 is divided into a lower inlet side or chamber 922 and an opposite upper outlet side or chamber 928 by the array of trays 918a through 918d, the outlet side 928 having an air or gas outlet 930 at its upper end. One or more liquid catch trays 926 may be provided in the lowermost part of the inlet chamber 922, as in the humidifier 110 of FIG. 1. Excess liquid L escapes from the lowermost tray 918d through the passage 932 therein to flow from the humidifier 910 through the liquid drain or outlet opening 934. This feature may be provided in other humidifiers as well.

The humidifier 910 also includes an air or gas inlet manifold 942 having air or gas outlet nozzles 944a through 944c extending therefrom, and functions substantially as described above for the humidifier 410 illustrated in FIG. 4 of the drawings. However, it will be noted that in the humidifier 410 of FIG. 4, the air or gas outlet 430 also serves as the liquid inlet for supplying liquid to the trays 418a through 418d. The humidifier 910 of FIG. 9 includes a separate liquid inlet or supply passage or duct 952. The separate passage 952 may be heated by any of a number of different means, thereby warming the liquid as it is delivered to the trays and increasing its vapor pressure to enhance evaporation of the liquid into the air or other gas as it percolates through the liquid in the trays. It will be seen that this separate liquid supply passage 952 may be incorporated in the humidifiers of FIGS. 1-5 and 8 as well.

Figure 10A:
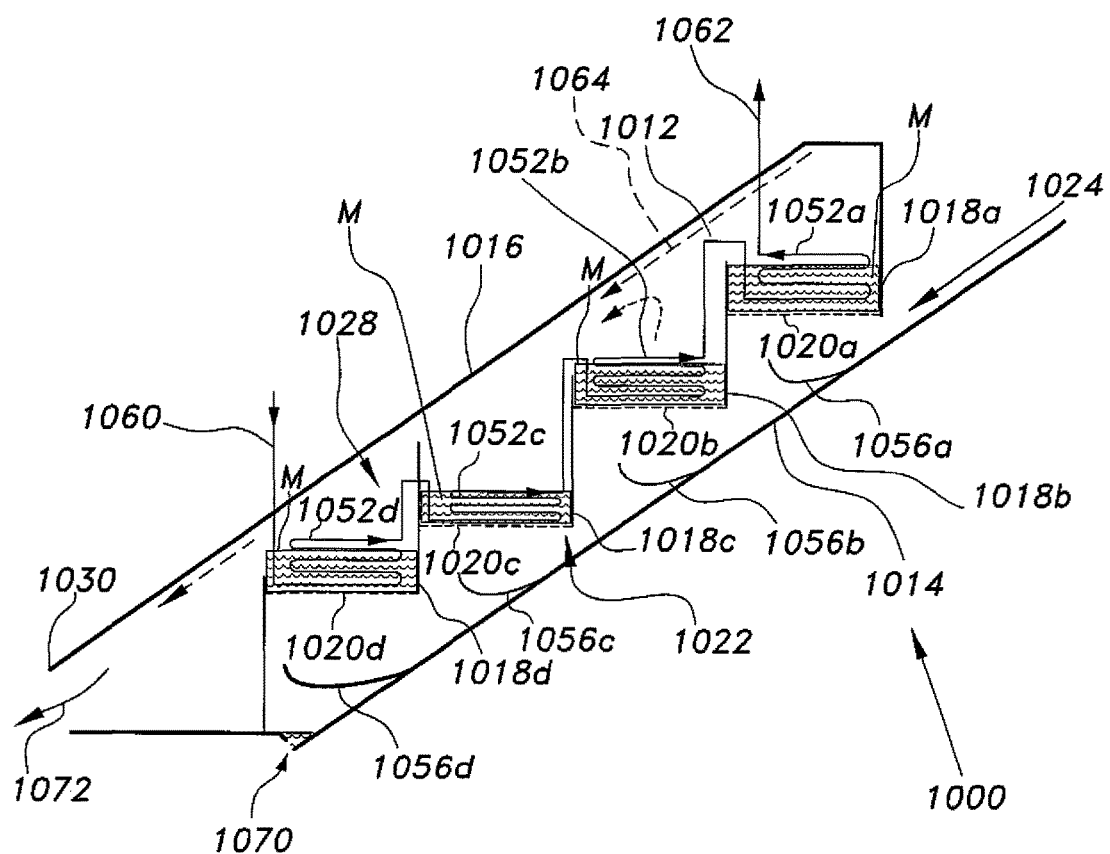
FIG. 10A is a schematic side elevation view of a dehumidifier for a humidification-dehumidification desalination system according to the present invention.

The humidification-dehumidification (HDH) desalination system also includes a dehumidifier for condensing the carrier gas after humidification by the humidifier. The dehumidifier has at least one liquid inlet, at least one liquid exit, at least one carrier gas inlet, at least one carrier gas exit, and an exit for purified water. In this case, the liquid inlet and the liquid outlet are in the form of coolant tubes for at least one sinuous or coiled heat exchanger tube disposed in a liquid containing tray for condensing the humidified carrier gas. The heat exchange fluid may be cooled seawater or brine, or other heat exchange liquid. Inside the dehumidifier, at least one stage bubble column condenser could be used, as illustrated in FIG. 10A. The bubble column eventually contains a bath of a liquid (e.g., fresh water), although the column may be initially empty and subsequently filled by fresh water as the humid carrier gas is condensed by circulation around the heat exchanger coils. Inside the bubble column chamber, the liquid remains on the bubble generator. The bubble generator could be in the form of, for instance, a sieve plate or a perforated plate with very small holes (e.g., diameter is 2 mm or less). Carrier gas (e.g., moist air) enters through a series of holes from the bottom, and is then condensed out. Subsequently, a purified liquid (e.g., fresh water) is collected. As noted above, the carrier gas inside the dehumidifier could be cooled by a different cooling fluid (e.g. refrigerant) and not the liquid (e.g. seawater) being purified. FIG. 10A depicts a stepped design multi-tray bubble dehumidifier. The humid carrier gas (e.g., air) that leaves the humidifier enters from one end, and in FIG. 10A, each step receives part of the humid carrier gas. The carrier gas penetrates through the orifices of each plate. Then the cooling coils cool down the humid carrier gas so that the purified liquid column starts to rise. When the column rises to a sufficient height, the purified water may pour down to the next lower step, or it may be directly removed as fresh water. As the carrier gas leaving the upper step passes over the lower steps, it further cools down, and hence, is further dehumidified in the succeeding stages (in such a case the carrier gas temperature is greater than the temperature of the liquid column in the lower steps).

The dehumidifier (condenser) may have more than one type of dehumidification method (e.g., one type is an indirect contact heat exchanger and one type is a direct contact heat and mass exchanger, such as bubble column vapor mixture) or the dehumidifier may have more than one stage of the same dehumidification enhancement method (e.g. four stages of bubble column vapor mixture in stepped design), as illustrated in FIG. 10A.

FIG. 10A provides a schematic side elevation view of a dehumidifier 1000 for the humidification-dehumidification (HDH) desalination system. The dehumidifier 1000 in FIG. 10A has a sloped housing 1012 having a sloped floor 1014, a sloped roof or ceiling 1016, and liquid containment trays 1018a through 1018d having porous floors or bottom surfaces 1020a through 1020d, respectively, that have the substantially the same construction as the floors 120a through 120d of the humidifier 110 of FIG. 1. The housing 1012 is divided by the array of trays 1018a through 1018d into a lower inlet side or chamber 1022 having an air or gas inlet 1024 at its upper end, and an opposite upper outlet side or chamber 1028, the outlet side 1028 having a combination air or other carrier gas outlet and liquid outlet 1030 at its lower end. Excess liquid M (purified water) escapes from the lowermost tray 1018d to flow out of the dehumidifier 1000 (as shown by arrow 1072) through the air or gas and liquid drain or outlet opening 1030. The dehumidifier 1000 may also include a smaller secondary drain outlet 1070 for purified water M that condenses or falls back into the lower chamber 1022 below the tray floors 1020*a* through 1020*d*.

The dehumidifier 1000 of FIG. 10A further includes an array of coolant circulation tubes 1052*a* through 1052*d* disposed within the corresponding liquid containment trays 1018*a* through 1018*d*. The liquid inlet 1060 is at the lower end of the housing 1012, and the liquid outlet 1062 is at the upper end of the housing 1012, i.e., the heat exchange fluid is in counterflow to the carrier gas, which travels in the direction of the dashed line arrows 1064 in FIG. 10A. Alternatively, the dehumidifier 1000 may be configured so that the heat exchange fluid flows parallel to the carrier gas). In the dehumidifier 1000 of FIG. 10A, it will be seen that the coolant circulation tubes 1052*a* through 1052*d* are connected in series with one another. However, it will be noted that each tray 1018*a*-1018*d* may be served by a separate, individual coolant circulation tube array in order to obviate the potential problem of the coolant being progressively warmed as it passes through the liquid M in each successive tray 1018*a*-1018*d*. The various coolant circulation tubes 1052*a* through 1052*d* may include radial fins or other means for enhancing heat transfer.

The dehumidifier 1000 further includes a series of airflow guides, baffles, or vanes 1056*a* through 1056*d* disposed beneath the respective trays 1018*a* through 1018*d*. These guides or vanes 1056*a* through 1056*d* serve to guide the air (or other gas) more efficiently toward the perforated floors 1020*a* through 1020*d* of the trays 1018*a* through 1018*d*. Such guides or vanes may be applied to any of the humidifiers or dehumidifiers described herein.

Figure 10B:
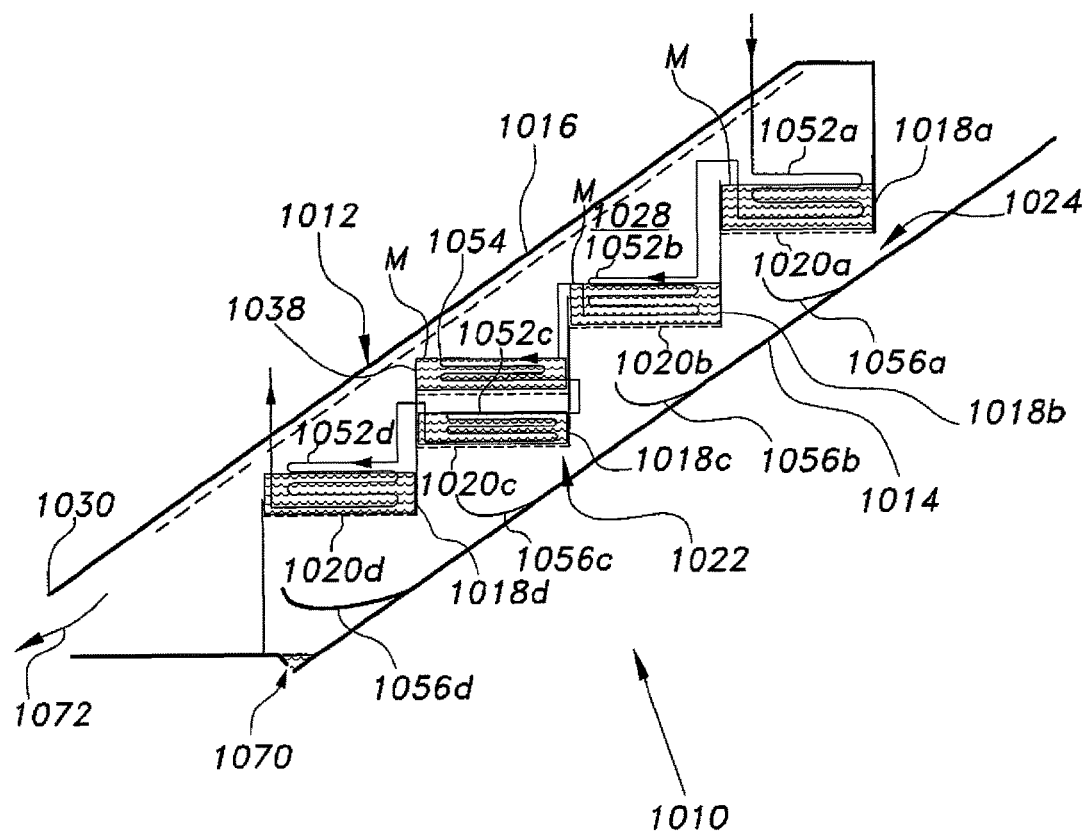
FIG. 10B is a schematic side elevation view of the dehumidifier of FIG. 10A in which one stage has been modified to include two bubble columns stacked vertically.

FIG. 10B provides a schematic side elevation view of a dehumidifier 1010 of the humidification-dehumidification desalination system substantially the same as dehumidifier 1000, but having two bubble columns stacked vertically. The dehumidifier 1010 is similar to the dehumidifier 1000 of FIG. 10A, including a sloped housing 1012, a sloped floor 1014, a sloped roof or ceiling 1016, and liquid containment trays 1018*a* through 1018*d* having porous floors or bottom surfaces 1020*a* through 1020*d*, respectively. The housing 1012 is divided by the array of trays 1018*a* through 1018*d* into a lower inlet side or chamber 1022 having an air or gas inlet 1024 at its upper end, and an opposite upper outlet side or chamber 1028, the outlet side 1028 having a combination air or gas and liquid outlet 1030 at its lower end. Excess liquid M (purified water) escapes from the lowermost tray 1018*d* to flow out of the dehumidifier 1010 through the air or gas and liquid drain or outlet opening 1030. The dehumidifier 1010 may also include a smaller secondary drain outlet 1070 for purified water M that condenses or falls back into the lower chamber 1022 below the tray floors 1020*a* through 1020*d*. The dehumidifier 1010 may also include one or more secondary liquid trays, e.g., secondary tray 1038, disposed above the third liquid containment tray 1018*c* (i.e., stacked bubble columns), so that humid carrier gas passing through this stage goes through two condensation stages. It will be understood that although FIG. 10B shows the secondary tray 1038 disposed over the third tray 1018*c*, the secondary tray 1038 may be disposed over any of the lower trays 1018*a* through 1018*d* and/or there may be more than one secondary tray 1038 disposed over one or more of the lower trays 1018*a* through 1018*d*.

The system 1010 of FIG. 10B further includes an array of coolant circulation tubes 1052*a* through 1052*d* disposed within the corresponding liquid containment trays 1018*a* through 1018*d*. The tubes 1052*a* through 1052*d* may include a section 1054 disposed within the secondary tank 1038 as well. In the dehumidifier 1010 of FIG. 10B, it will be seen that the coolant circulation tubes 1052*a* through 1054 are connected in series with one another. However, it will be noted that each tray may be served by a separate, individual coolant circulation tube array in order to obviate the potential problem of the coolant being progressively warmed as it passes through the liquid in each successive tray 1018*a* through 1018*d*. The various coolant circulation tubes 1052*a* through 1054 may include radial fins or other means for enhancing heat transfer.

The dehumidifier 1010 further includes a series of airflow guides, baffles, or vanes 1056*a* through 1056*d* disposed beneath the respective trays 1018*a* through 1018*d*. These guides or vanes 1056*a* through 1056*d* serve to guide the air (or other carrier gas) more efficiently toward the perforated floors 1020*a* through 1020*d* of the trays 1018*a* through 1018*d*.

Figure 11:
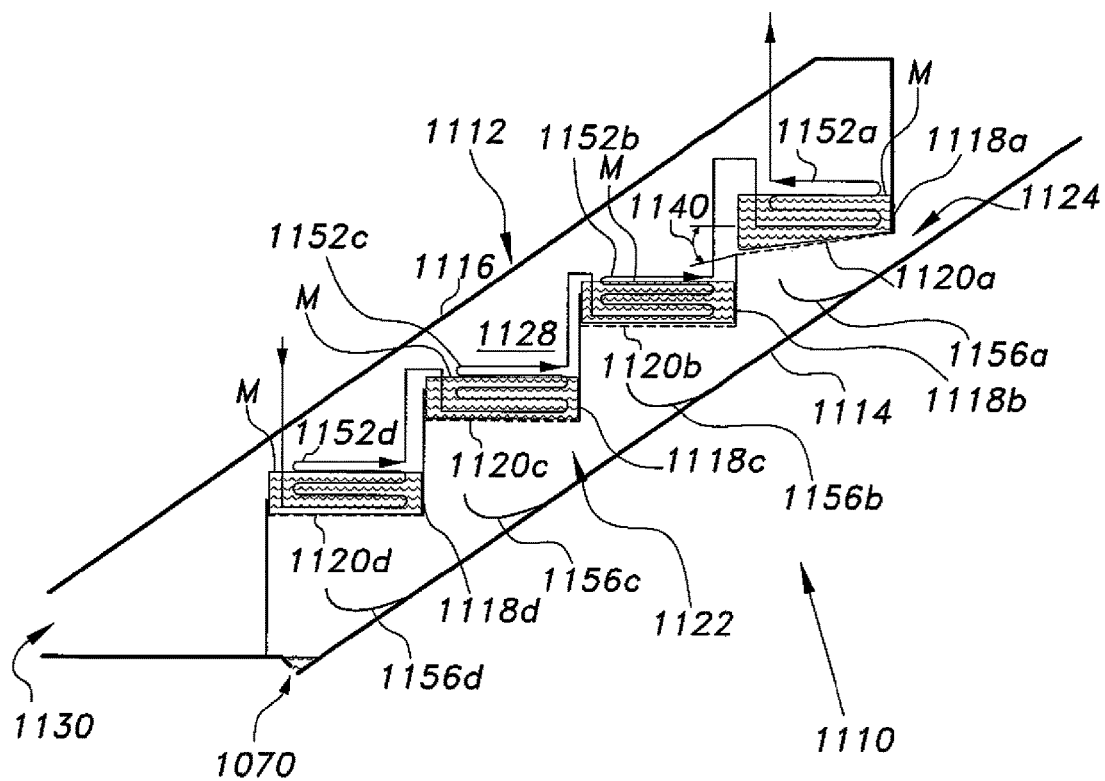
FIG. 11 is a schematic side elevation view of the dehumidifier of FIG. 10A, shown with the perforated plate of the upper stage inclined to enhance dehumidification.

FIG. 11 provides a schematic side elevation view of a dehumidifier 1010 of the humidification-dehumidification desalination system substantially the same as dehumidifier 1000 of FIG. 10A, but having the floor of the uppermost bubble column sloped. The dehumidifier 1110 is similar to the dehumidifier 1000 of FIG. 10A, having a sloped housing 1112, a sloped floor 1114, a sloped roof or ceiling 1116, and liquid containment trays 1118*a* through 1118*d* having porous floors or bottom surfaces 1120*a* through 1120*d*, respectively. The housing 1112 is divided by the array of trays 1118*a* through 1118*d* into a lower inlet side or chamber 1122 having an air or gas inlet 1124 at its upper end, and an opposite upper outlet side or chamber 1128, the outlet side 1128 having a combination air or gas and liquid outlet 1130 at its lower end. Excess liquid M (purified water) escapes from the lowermost tray 1118*d* to flow out of the dehumidifier 1110 through the air or gas and liquid drain or outlet opening 1130. The dehumidifier 1110 may also include a smaller secondary drain outlet 1170 for purified water M that condenses or falls back into the lower chamber 1122 below the tray floors 1120*a* through 1120*d*.

The dehumidifier 1110 of FIG. 11 further includes an array of coolant circulation tubes 1152*a* through 1152*d* disposed within the corresponding liquid containment trays 1118*a* through 1118*d*, as in the dehumidification system embodiment 1000 of FIG. 10A. It will be noted that the coolant flow of the dehumidifier 1110 of FIG. 11 is opposite that of the dehumidifier 1010 of FIG. 10B, as indicated by the flow arrows along the coolant circulation tubes. However, the direction of coolant flow may be determined as a matter of choice in any of the dehumidifiers described herein. The dehumidifier 1110 further includes a series of airflow guides, baffles, or vanes 1156*a* through 1156*d* disposed beneath the respective trays 1118*a* through 1118*d*, as in the dehumidifier 1010 of FIG. 10A.

In the dehumidifier 1110 of FIG. 11, the floor 1120*a* of the first or uppermost liquid containment tray 1118*a* is sloped toward the successively lower trays 1118*b* through 1118*d*, as shown by the slope 1140, in the manner of the tray floor 320*a* and its slope 340 of the third embodiment 310 of FIG. 3. The purpose of this slope 1140 is to assist in the collection of contaminants and/or sediment that might otherwise collect over the entire surface of the floor 1120*a* and might tend to block the pores in the porous floor, as noted for the sloped floor 320*a* of the embodiment 310 of FIG. 3. Any or all of the various liquid containment trays 1118*a* through 1118*d* may be equipped with such a sloped floor. The floor 1118*a* may be permanently installed with such a slope, or the dehumidifier 1110 may be constructed to have a manually or automatically actuated mechanism to tilt or slope the floor 1118*a* periodically.

Figure 12:
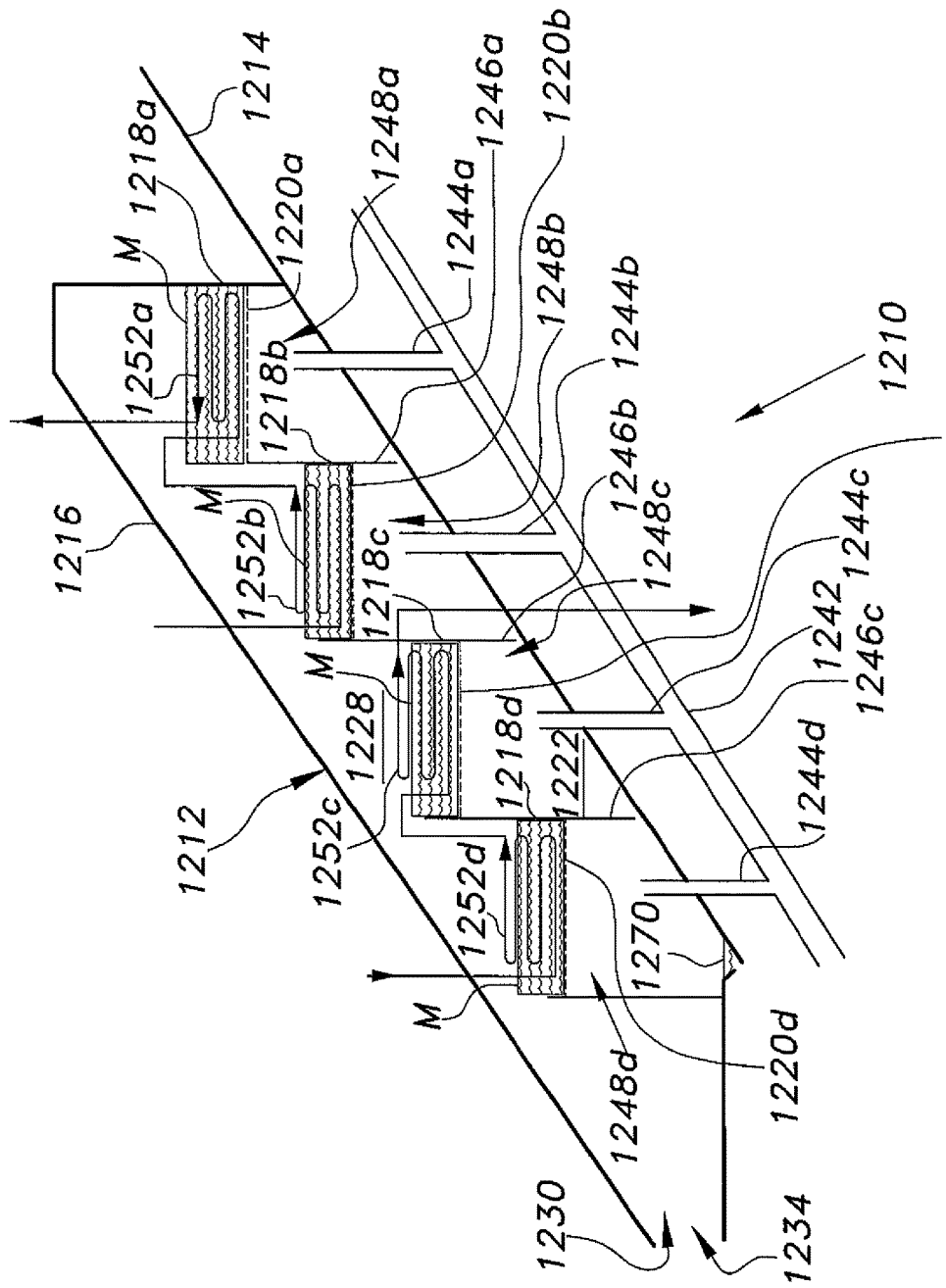
FIG. 12 is a schematic side elevation view of the dehumidifier of FIG. 10A, shown with the addition of a carrier gas plenum.

FIG. 12 provides a schematic side elevation view of a dehumidifier 1210 of the humidification-dehumidification desalination system substantially the same as dehumidifier 1000 of FIG. 10A, but having a carrier gas plenum. The dehumidifier 1210 is similar to the dehumidifier 1000 of FIG. 10A, having a sloped housing 1212, a sloped floor 1214, sloped roof or ceiling 1216, and liquid containment trays 1218a through 1218d having porous floors or bottom surfaces 1220a through 1220d, respectively. The housing 1212 is divided by the array of trays 1218a through 1218d into a lower inlet side or chamber 1222 and an opposite upper outlet side or chamber 1228, the outlet side 1228 having an air or gas outlet 1230 at its lower end. The dehumidifier 1210 may also include a smaller secondary drain outlet 1270 for purified water M that condenses or falls back into the lower chamber 1222 below the tray floors 1220a through 1220d. Excess liquid M (purified water) escapes from the lowermost tray 1218d to flow out of the dehumidifier 1210 through the liquid drain or outlet opening 1234 shared with the air or gas outlet 1230.

The dehumidifier 1210 also includes an air or gas inlet manifold 1242 having air or gas outlet nozzles 1244a through 1244c extending therefrom that functions substantially as described above for the humidifier 410 illustrated in FIG. 4 of the drawings. However, the dehumidifier 1210 of FIG. 12 may include a series of walls 1246a, 1246b, and 1246c to define a series of four separate inlet chambers 1248a, 1248b, 1248c, and 1248d beneath the respective liquid trays 1218a, 1218b, 1218c, and 1218d, as in the humidifier 510 of FIG. 5. Each of the gas outlet nozzles or tubes 1244a through 1244d communicates with the corresponding chamber 1248a through 1248d to provide more precise control over the air or gas flow. The humidified air or gas is introduced into the manifold 1242 from either or both ends thereof, from which it flows through the four outlets 1244a through 1244d to percolate upward through the liquid M in the corresponding liquid trays 1218a through 1218d. The chilled and dehumidified air or other gas then exits the upper chamber 1228 from the air or gas outlet 1230 at the lower end thereof.

The dehumidifier 1210 of FIG. 12 further includes an array of coolant circulation tubes 1252a through 1252d disposed within the corresponding liquid containment trays 1218a through 1218d. In the dehumidifier 1210 of FIG. 12, it will be seen that the coolant circulation tubes 1252a through 1252d comprise two separate subsystems. The circulation tubes 1252a and 1252b are connected in series with one another, and the coolant circulation tubes 1252c and 1252d are connected in series with one another separately from the tubes 1252a and 1252b. Alternatively, each tray may be served by a separate, individual coolant circulation tube array in order to obviate the potential problem of the coolant being progressively warmed as it passes through the liquid in each successive tray.

Figure 13:
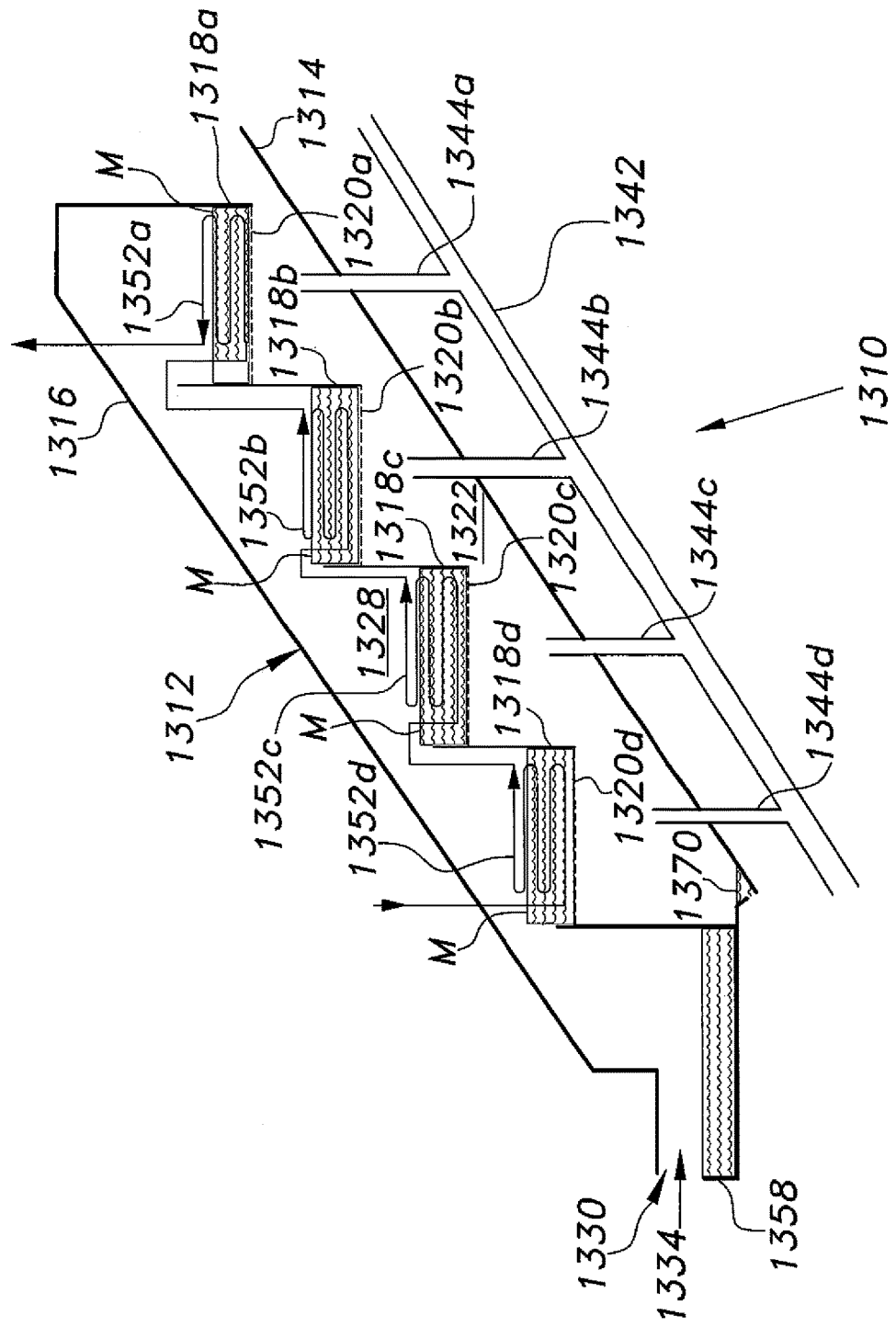
FIG. 13 is a schematic side elevation view of the dehumidifier of FIG. 10A, shown with the addition of a pool of purified liquid at the lower end of the dehumidifier after the last bubble column stage.

FIG. 13 provides a schematic side elevation view of a dehumidifier 1310 of the humidification-dehumidification desalination system substantially the same as dehumidifier 1210 of FIG. 12, but having a pool of purified liquid at the lower end of the dehumidifier after the last bubble column stage. The dehumidifier 1310 is similar to the dehumidifier 1210 of FIG. 12, having a sloped housing 1312, a sloped floor 1314, a sloped roof or ceiling 1316, and liquid containment trays 1318a through 1318d having porous floors or bottom surfaces 1320a through 1320d, respectively. The housing 1312 is divided by the array of trays 1318a through 1318d into a lower inlet side or chamber 1322 and an opposite upper outlet side or chamber 1328, the outlet side 1328 having an air or gas outlet 1330 at its lower end. The dehumidifier 1310 may also include a smaller secondary drain outlet 1370 for purified water M that condenses or falls back into the lower chamber 1322 below the tray floors 1320a through 1320d. Excess liquid M escapes from the lowermost tray 1318d to flow out of the dehumidifier 1310 through the liquid drain or outlet opening 1334 shared with the air or gas outlet 1330.

The dehumidifier 1310 also includes an air or gas inlet manifold 1342 having air or gas outlet nozzles 1344a through 1344d extending therefrom, and functions substantially as described above for the dehumidifier 1210 illustrated in FIG. 12 of the drawings. The air or gas to be humidified is introduced into the manifold 1342 from either or both ends thereof, from which it flows through the four outlets 1344a through 1344d to percolate upward through the liquid M in the corresponding liquid trays 1318a through 1318d. The chilled and dehumidified air or other gas then exits the upper chamber 1328 from the air or gas outlet 1330 at the lower end thereof. The lower chamber, however, lacks the partition walls restricting the nozzles 1344a through 1344d to individual trays 1318a through 1318d.

The dehumidifier 1310 of FIG. 13 further includes an array of coolant circulation tubes 1352a through 1352d disposed within the corresponding liquid containment trays 1318a through 1318d. The coolant circulation tubes 1352a through 1352d are connected in series with one another. However, it will be noted that each tray 1318a through 1318d may be served by a separate, individual coolant circulation tube array in order to obviate the potential problem of the coolant being progressively warmed as it passes through the liquid in each successive tray. Alternatively, the coolant circulation tubes 1352a through 1352d may comprise two separate subsystems, as in the dehumidifier 1210 of FIG. 12. In any event, further dehumidification of the air or gas is provided by the outlet tray 1358 of cooled purified liquid disposed at the air or gas and liquid outlets 1330 and 1334 of the upper or outlet side 1328 of the chamber or housing 1312. Liquid passing over this cooled or chilled pool of liquid is cooled further, thereby resulting in further condensation from the air or gas.

Figure 14:
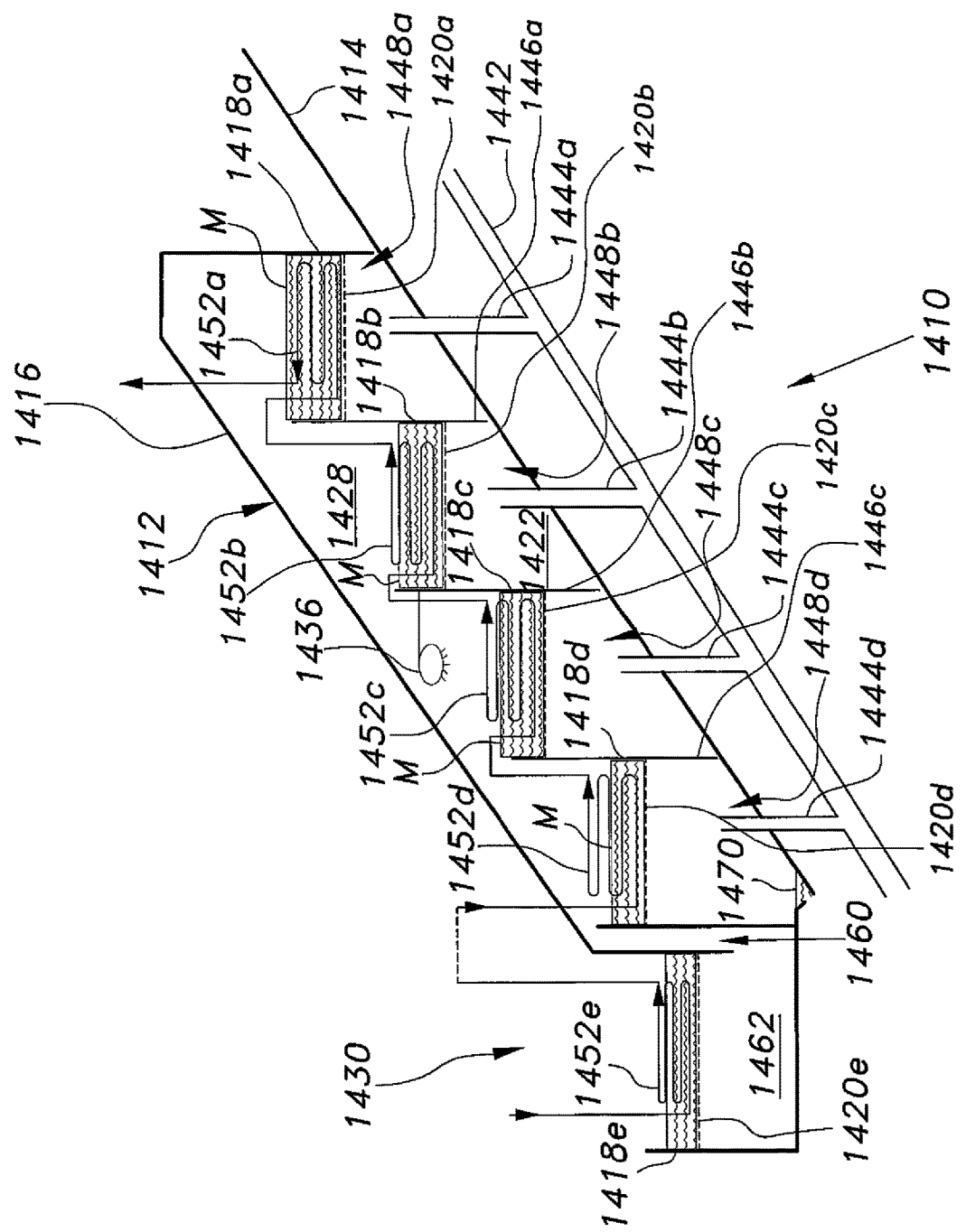
FIG. 14 is a schematic side elevation view of the dehumidifier of FIG. 10A, shown with the addition of a final bubble column stage through which all of the carrier gas is directed, so that the carrier gas passes through two bubble columns.

FIG. 14 provides a schematic side elevation view of a dehumidifier 1310 of the humidification-dehumidification desalination system substantially the same as dehumidifier 1210 of FIG. 12, but having a final bubble column stage through which all of the carrier gas is directed, so that the carrier gas passes through two bubble columns. The dehumidifier 1410 is similar to the dehumidifier 1210 of FIG. 12, having a sloped housing 1412, a sloped floor 1414, a sloped roof or ceiling 1416, and liquid containment trays 1418a through 1418d having porous floors or bottom surfaces 1420a through 1420d, respectively. The housing 1412 is divided by the array of trays 1418a through 1418d into a lower inlet side or chamber 1422 and an opposite upper outlet side or chamber 1428, the outlet side 1428 having an air or gas outlet 1430 at its lower end. The dehumidifier 1410 may also include a smaller secondary drain outlet 1470 for purified water M that condenses or falls back into the lower chamber 1422 below the tray floors 1420a through 1420d.

The dehumidifier 1410 also includes an air or gas inlet manifold 1442 having air or gas outlet nozzles 1444a through 1444d extending therefrom, and functions substantially as described above for the dehumidifier 1210 illustrated in FIG. 12 of the drawings. However, the dehumidifier 1410 of FIG. 14 includes a series of walls 1446a, 1446b, and 1446c to define a series of four separate inlet chambers 1448a, 1448b, 1448c, and 1448d beneath the respective liquid trays 1418*a*, 1418*b*, 1418*c*, and 1418*d*, as in the dehumidifier 1210 of FIG. 12. Each of the gas outlet nozzles or tubes 1444*a* through 1444*d* communicates with the corresponding chamber 1448*a* through 1448*d* to provide more precise control over the air or gas flow. The humidified air or gas is introduced into the manifold 1442 from either or both ends thereof, from which it flows through the four outlets 1444*a* through 1444*d* to percolate upward through the liquid M in the corresponding liquid trays 1418*a* through 1418*d*. The chilled and dehumidified air or other gas then exits the upper chamber 1428 from the air or gas outlet 1430 at the lower end thereof. At least one sprayer, e.g., sprayer 1436 disposed over the third liquid tray 1418*c*, may be included in the dehumidifier 1410.

The dehumidifier 1410 of FIG. 14 further includes an array of coolant circulation tubes 1452*a* through 1452*d* disposed within the corresponding liquid containment trays 1418*a* through 1418*d*. In the dehumidifier 1410 of FIG. 14 the coolant circulation tubes 1452*a* through 1452*d* are connected in series with one another in a single flow path. Other arrangements may be provided, as described further above for other embodiments.

The dehumidifier 1410 of FIG. 14 further includes an additional liquid collection tray 1418*e* at the base of the housing 1412. The cooled and dehumidified air or gas flows from the lower portion of the outlet side 1428 of the chamber or housing 1412 through a passage 1460 between the lowermost tray 1418*d* and an outlet chamber 1462. The air or gas then percolates through the perforated floor 1420*e* of the fifth liquid collection tray 1418*e* to exit through the air or gas outlet 1430 above the fifth tray 1418*e*. The coolant circulation tubes 1452*a* through 1452*d* may include an extension 1452*e* disposed within the fifth liquid tray 1418*e*, either in series with the other coolant circulation tube assemblies 1452*a* through 1452*d*, or as a separate unit. In essence, the dehumidifier 1410 of FIG. 14 includes five liquid collection trays 1418*a* through 1418*e* and their associated components, but it will be seen that more or fewer such trays and their associated components may be provided as desired. In this manner, the humidified carrier gas passes through a first bubble column (provided by tray 1418*a*, 1418*b*, 1418*c*, or 1418*d*) and then a second bubble column (provided by tray 1418*e*), thus receiving two stages of dehumidification in addition to the cooling effect of passing over the lowermost cooled trays of purified liquid when passing through the upper side 1428 of the housing 1412.

Figure 15:
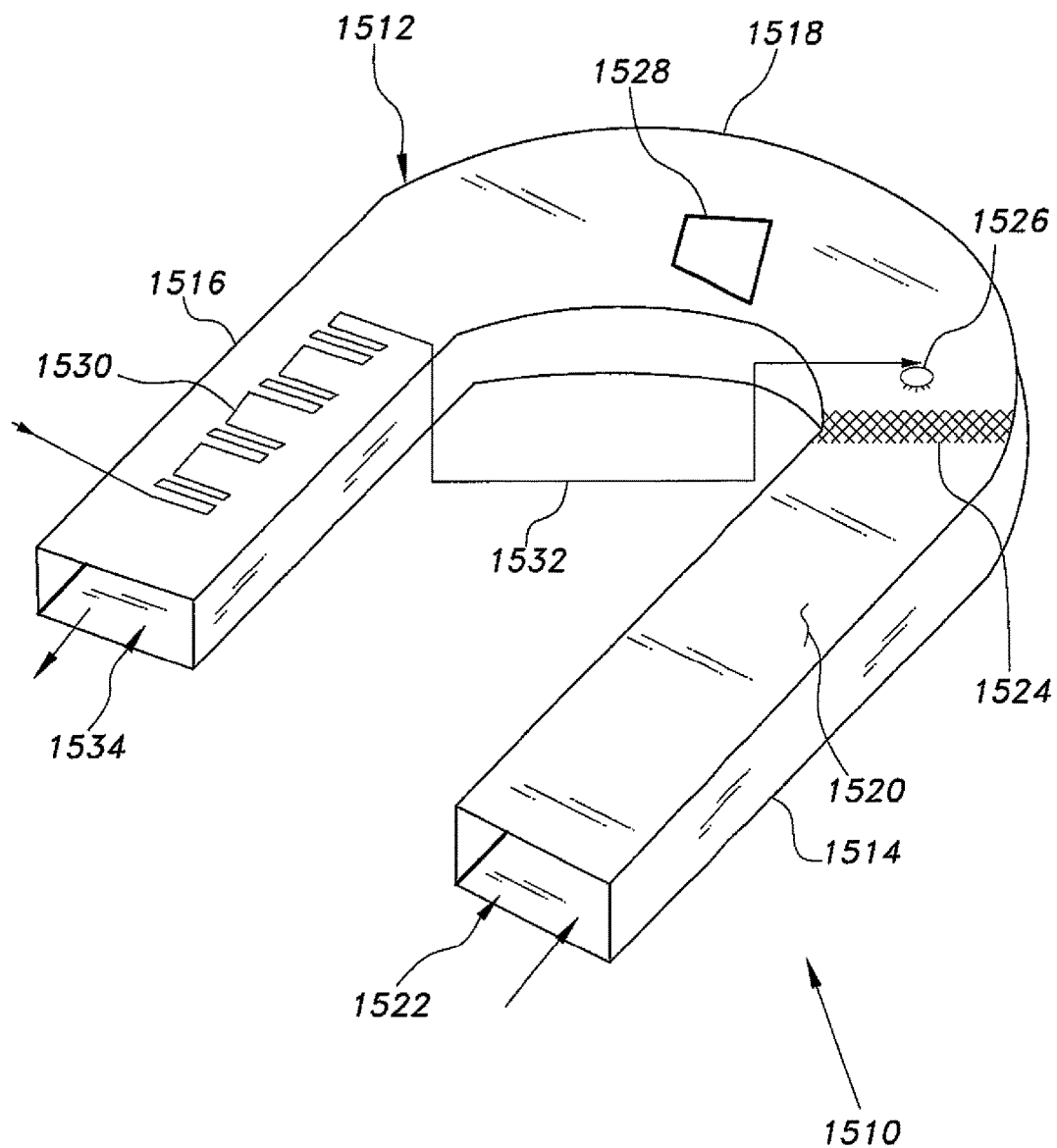
FIG. 15 is a schematic perspective view of an open carrier gas humidification-dehumidification desalination system in which cooling fluid from the dehumidifier, after being heated by condensation, is used in a sprayer/packed bed system in the humidifier to enhance humidification of the carrier gas.

FIG. 15 provides a schematic perspective view of an open carrier gas humidification-dehumidification desalination system 1510 in which cooling fluid from the dehumidifier, after being heated by condensation, is used in a sprayer/packed bed system in the humidifier to enhance humidification of the carrier gas. The system 1510 is installed in a single housing 1512 having a humidification section 1514 and a dehumidification section 1516 connected in series. As shown in FIG. 15, the two sides are laterally offset and parallel to one another, and joined by an intermediate housing section 1518. However, the humidification and dehumidification sections 1514 and 1516 may be constructed in a linear arrangement or other configuration, as desired. In most of the embodiments of a humidification-dehumidification desalination system described herein, the humidifier and the dehumidifier are modular, i.e., they are thermally separated. However, the two sections 1514 and 1516 may share a common wall for heat transfer therebetween, if desired. The system 1510 of FIG. 15 is an open carrier gas cycle system, i.e., the air or gas flowing therethrough passes through the system only once. Other embodiments may comprise closed cycle systems, wherein the air or other carrier gas is recycled through the system. The upper surface 1520 of the humidification section 1514 is preferably transparent, in order to receive insolation to warm the air or gas flowing therethrough and thus increases the ability of the gas to absorb additional moisture or other liquid in a gaseous or vapor state.

Air (or other gas) enters the humidification section 1514 through its open entrance 1522, and flows through a humidifier contained within the humidification section 1514. Although the humidifier is not shown in FIG. 15, it will be understood that it may comprise any of the humidifiers 110 through 910 of FIGS. 1 through 9, described in detail further above. The humidification section 1514 may further include a packing bed 1524 similar to the packing bed 750 of the humidifier 710 of FIG. 7, and a sprayer 1526 similar to, e.g., the sprayer 236*a* or 236*b* of the humidifier 210 of FIG. 2 to further increase the humidity of the air or gas flowing through the humidification section 1514.

The humidified air or gas exits the humidification section 1514 and flows through the intermediate section 1518, where it passes through a mechanical circulation device 1528. The mechanical circulation device may comprise any of a number of different devices for moving or circulating a gas, e.g., a mechanical or thermal vapor compressor, a blower or fan, a turbocharger, etc. The circulation device 1528 serves to move the air or other carrier gas through the system 1510, and in the case of a compressor, heat the air or gas as well. The circulation device may be installed externally to the humidification section 1514 at its open entrance 1522, or may be installed externally to the dehumidification section 1516 to draw the air or gas through the system. The system 1510 of FIG. 15, as well as other embodiments disclosed herein, may be configured to have certain portions operating at above, below, or ambient atmospheric pressure. In these embodiments, the circulation device 1528 may comprise a compressor installed between the humidifier and dehumidifier sections in order to compress the air (or other gas) as it leaves the humidifier and enters the dehumidifier. This results in a higher pressure within the dehumidifier section 1516 than in the humidifier section 1514, and corresponding advantages in operation of the system.

From the intermediate section 1518, the air or gas flows to the dehumidification section 1516 containing a dehumidifier. Although the dehumidifier is not shown in FIG. 15, it will be understood that it may comprise any of the dehumidifiers 1000 through 1410 of FIGS. 10A through 14, described in detail further above. The liquid within the dehumidification system trays is chilled by a cooling fluid (e.g., brackish water, etc.) that passes through coolant circulation tubes 1530 installed in the trays of the dehumidification system 1516. The coolant may be provided in an open cycle in counterflow to the carrier gas, entering the dehumidification section 1516, passing through the tubes 1530 to condense the humid carrier gas, then flowing to the sprayer 1526 in the humidification section 1514 through a transfer line 1532. After the air or gas has been cooled and dehumidified, it exits the dehumidification section 1516 through its open exit end 1534, being vented to the atmosphere or otherwise disposed of. It will be understood that the liquid to be purified (e.g., seawater or brine) may be introduced directly into the trays of the humidifier in the humidification section 1514 as described in FIGS. 1-9, and the portion not vaporized in the carrier gas may exit the humidification section 1514 for disposal, or may be recycled as coolant in the dehumidification section 1516.

Figure 16:
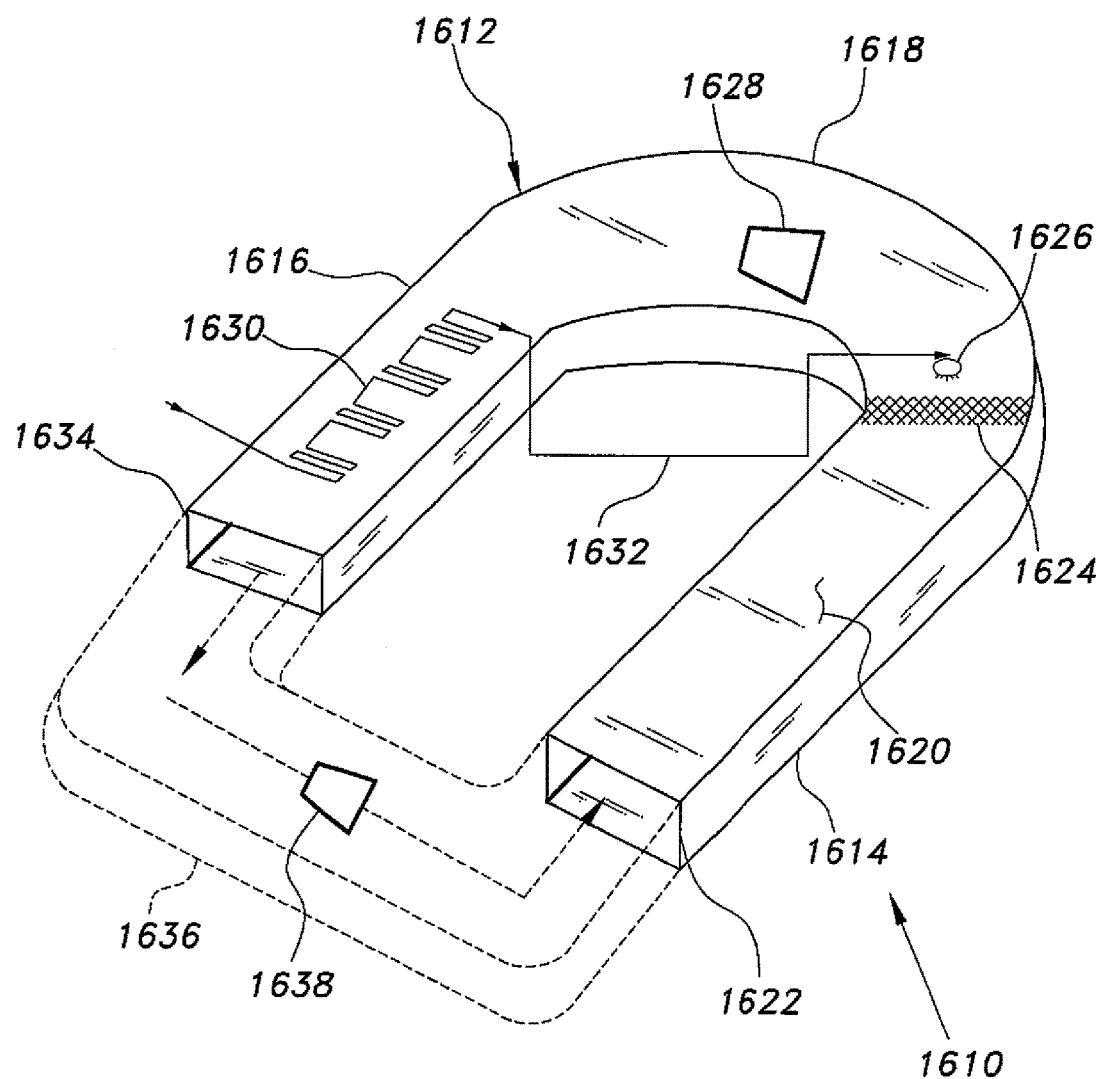
FIG. 16 is a schematic perspective view of an closed loop carrier gas humidification-dehumidification desalination system in which carrier gas exiting the dehumidifier is recycled back to re-enter the humidifier.

FIG. 16 provides a schematic perspective view of an closed loop carrier gas humidification-dehumidification desalination system in which carrier gas exiting the dehumidifier is recycled back to re-enter the humidifier. The humidification-dehumidification desalination system 1610 is somewhat similar to the system 1510 of FIG. 15, having a housing 1612 defining a humidification section 1614 and a dehumidification section 1616 joined by an intermediate section 1618, and an upper surface 1620 of the humidification section 1614 preferably being transparent. Air (or other carrier gas) enters the entrance or inlet 1622 of the humidification section 1614 and passes through a humidifier similar to those described in FIGS. 1 through 9. The humidification section may include a packing bed 1624 and/or sprayer 1626. The air or gas then flows through a circulation device 1628 in the intermediate section 1618 and into the dehumidification section 1616, where it flows through a dehumidifier similar to those described in FIGS. 10A through 14. The dehumidified air or carrier gas then exits the dehumidification section 1616 from its outlet 1634. A series of coolant circulation tubes 1630 cools the liquid of the dehumidification system in the dehumidification section 1616. Coolant from the circulation tubes may then flow through a transfer line 1632 to the sprayer 1626. The transfer line 1632 may include means for absorbing heat energy, e.g., having a blackened surface, in order to heat the coolant as it flows through the transfer line 1632 from the dehumidification section 1616 to the humidification section 1614.

The humidification-dehumidification desalination system 1610 of FIG. 16 differs from the system 1510 of FIG. 15 in that it may be configured as a closed carrier gas system. An air or carrier gas recirculation section 1636 (shown in broken lines in FIG. 16) extends between the outlet 1634 of the dehumidification section 1616 and the inlet 1622 of the humidification section 1614. In this manner, the air (or other carrier gas) may be continually recycled through the system 1610, alternately being humidified and dehumidified. The liquid provided to humidify the air or gas may be an impure liquid, e.g., salt water, etc., and the liquid may be recovered as purified liquid from the dehumidification section 1616. The air or carrier gas then recirculates through the humidification section 1614 to pick up more of the liquid, which may be continually replenished as needed from an external source. A pressure recovery device 1638, (e.g., an expansion or throttle valve, turbine, etc.) may be installed in the recirculation section 1636. If a turbine is used for the device 1638, the energy recovered may be used to drive other mechanisms.

Figure 17:
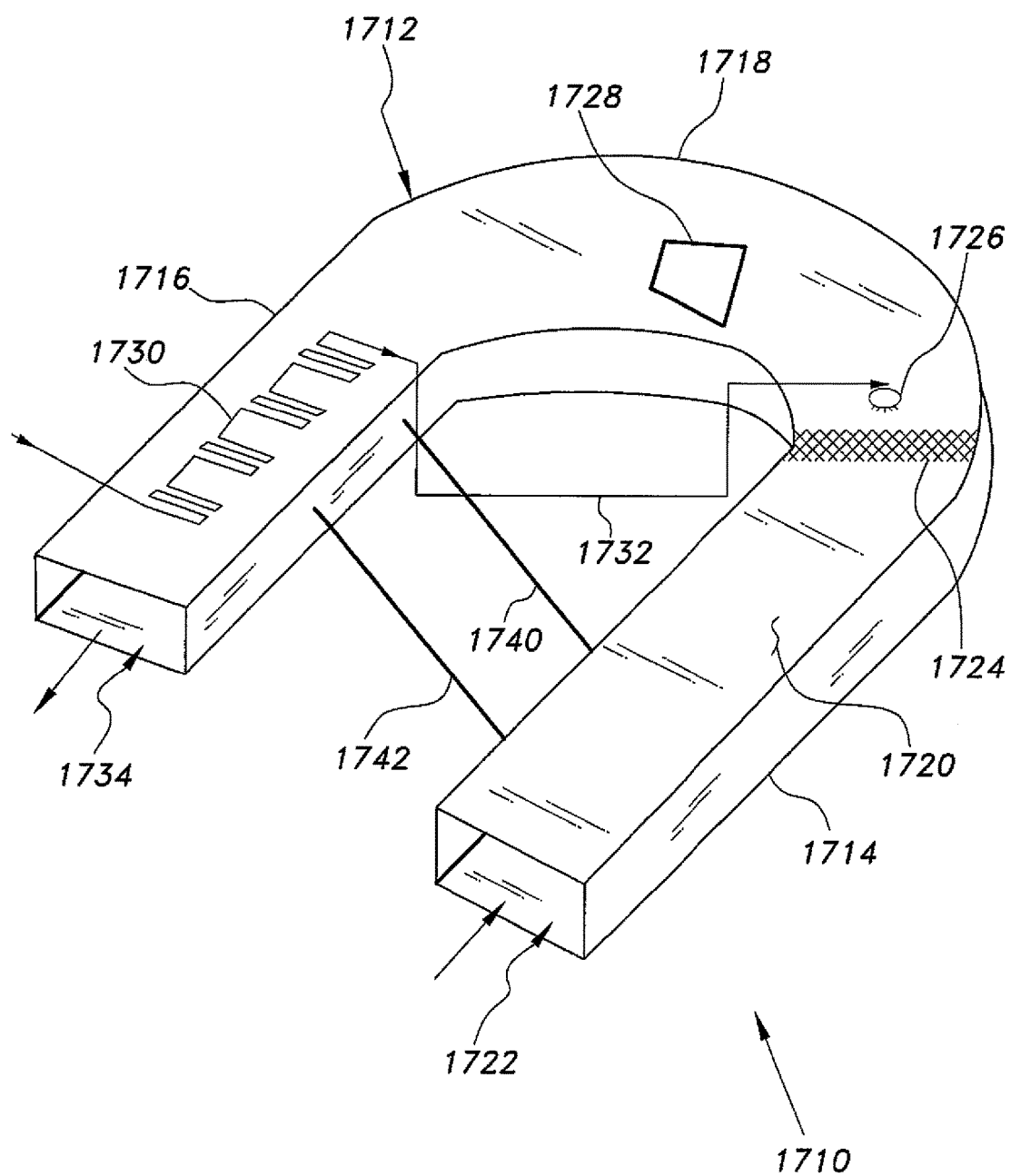
FIG. 17 is a schematic perspective view of the open carrier gas humidification-dehumidification desalination system of FIG. 15 with the addition of extraction/injection lines between the humidifier and the dehumidifier.

FIG. 17 provides a schematic perspective view of the open carrier gas humidification-dehumidification desalination system of FIG. 15 with the addition of extraction/injection lines between the humidifier and the dehumidifier. The humidification-dehumidification desalination system 1710 is somewhat similar to the fifteenth embodiment 1510 of FIG. 15, having a housing 1712 defining a humidification section 1714 and a dehumidification section 1716 joined by an intermediate section 1718, and an upper surface 1720 of the humidification section 1714 being transparent. Air (or other gas) enters the open entrance or inlet 1722 of the humidification section 1714 and passes through a humidifier similar to those described further above in FIGS. 1-9. The humidification section may include a packing bed 1724 and/or sprayer 1726. The air or carrier gas then flows through a circulation device 1728 in the intermediate section 1718 and into the dehumidification section 1716, where it flows through a dehumidifier similar to those described further above in FIGS. 10A through 14. A series of coolant circulation tubes 1730 cools the liquid of the dehumidifier in the dehumidification section 1716, and coolant from the circulation tubes may then flow through a transfer line 1732 to the sprayer 1726, where it is sprayed through the packed bed 1724. The dehumidified air or gas exits the dehumidification section 1716 from its open exit or outlet 1734.

The humidification-dehumidification desalination system 1710 of FIG. 17 differs from the system 1510 of FIG. 15 in that the system 1710 includes first and second exchange conduits 1740 and 1742 (extraction/injection lines) extending between the humidification section 1714 and the dehumidification section 1716. The conduits 1740 and 1742 serve to transfer air or other carrier gas and/or liquid from the humidification section 1714 to the dehumidification section 1716, or in the opposite direction, for further treatment of the air or gas and/or liquid. One conduit may transfer fluid in one direction, while the other conduit transfers fluid in the opposite direction from the first conduit. Alternatively, a single conduit may be provided to transfer gas and/or liquid in either direction, as desired.

Figure 18:
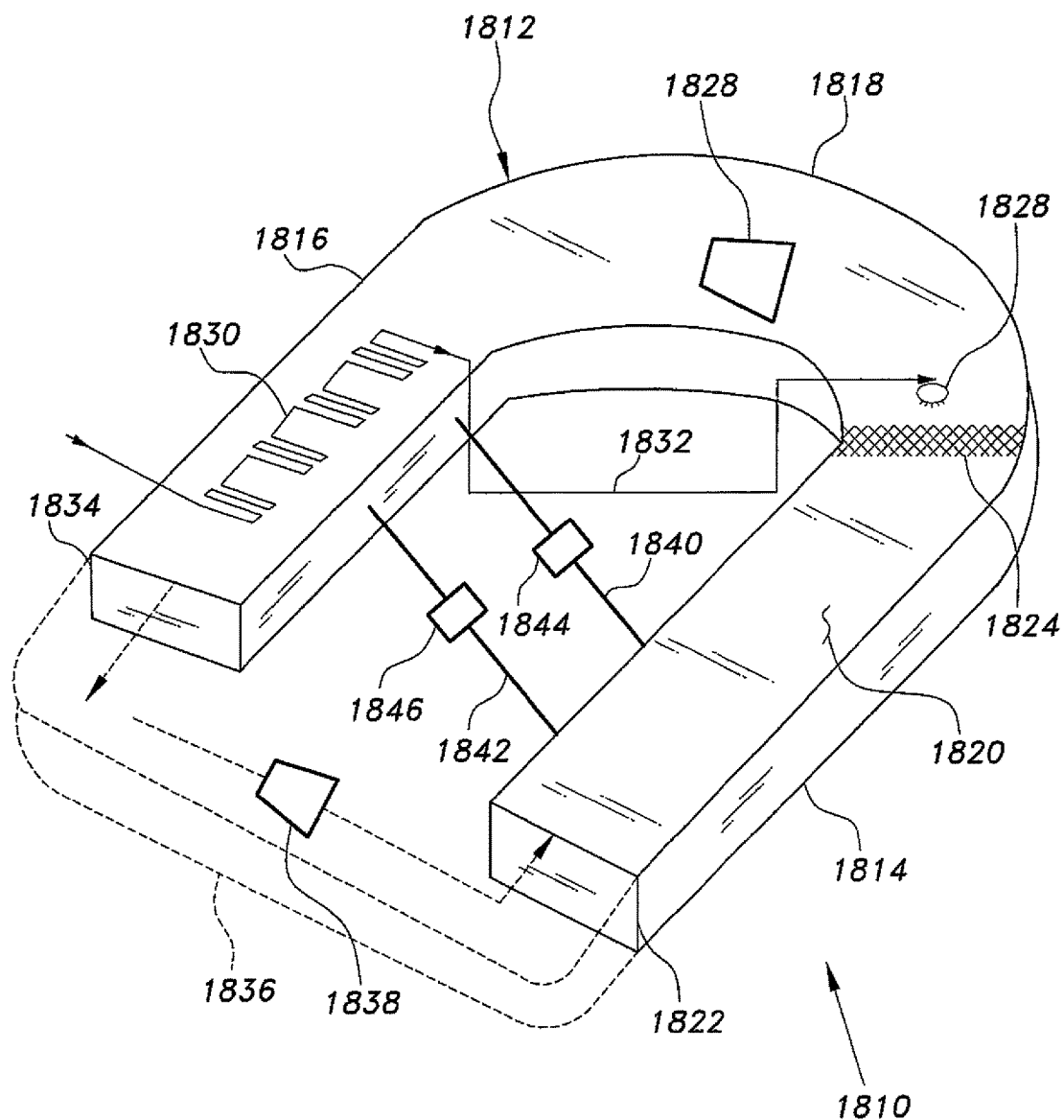
FIG. 18 is a schematic perspective view of the closed loop carrier gas humidification-dehumidification desalination system of FIG. 16 with the addition of extraction/injection lines between the humidifier and the dehumidifier.

FIG. 18 provides a schematic perspective view of the closed loop carrier gas humidification-dehumidification desalination system of FIG. 16 with the addition of extraction/injection lines between the humidifier and the dehumidifier. The humidification-dehumidification desalination system 1810 combines features of the system 1610 and system 1710 of FIGS. 16 and 17, respectively, having a housing 1812 defining a humidification section 1814 and a dehumidification section 1816 joined by an intermediate section 1818, an upper surface 1820 of the humidification section 1814 being transparent. Air (or other carrier gas) enters the entrance or inlet 1822 of the humidification section 1814 and passes through a humidifier similar to those described in FIGS. 1-9. The humidifier section may include a packing bed 1824 and/or sprayer 1826. The air or carrier gas then flows through a circulation device 1828 in the intermediate section 1818 and into the dehumidification section 1816, where it flows through a dehumidifier similar to those described in FIGS. 10A through 14. A series of coolant circulation tubes 1830 cools the liquid of the dehumidifier in the dehumidification section 1816, and coolant from the circulation tubes may then flow through a transfer line 1832 to the sprayer 1826. The dehumidified air or carrier gas then exits the dehumidification section 1816 from its exit or outlet 1834.

The humidification-dehumidification desalination system 1810 of FIG. 18 has a recirculation system 1836 and a pressure recovery device 1838 to form a closed system, as provided in the system 1610 of FIG. 16. The system 1810 of FIG. 18 also includes first and second exchange conduits 1840 and 1842 (extraction/injection lines) extending between the humidification section 1814 and the dehumidification section 1816. The functions of these conduits 1840 and 1842 have been described further above in the discussion of the system 1710 of FIG. 17. As the air or carrier gas in the dehumidification section 1816 of the closed circulation system 1810 is at a higher pressure than the air or gas in the humidification system 1814 due to the circulation device 1828 (e.g., compressor, etc.), a secondary circulation or compression device 1844 is installed within the exchange conduit that transfers fluid from the lower pressure humidification section 1814 to the higher pressure dehumidification section 1816, e.g., the first exchange conduit 1840. A pressure recovery device 1846 is installed in the opposite second conduit 1842 to drop the pressure of the fluid as it flows from the higher pressure dehumidification section 1816 back to the lower pressure humidification section 1814.

Figure 19:
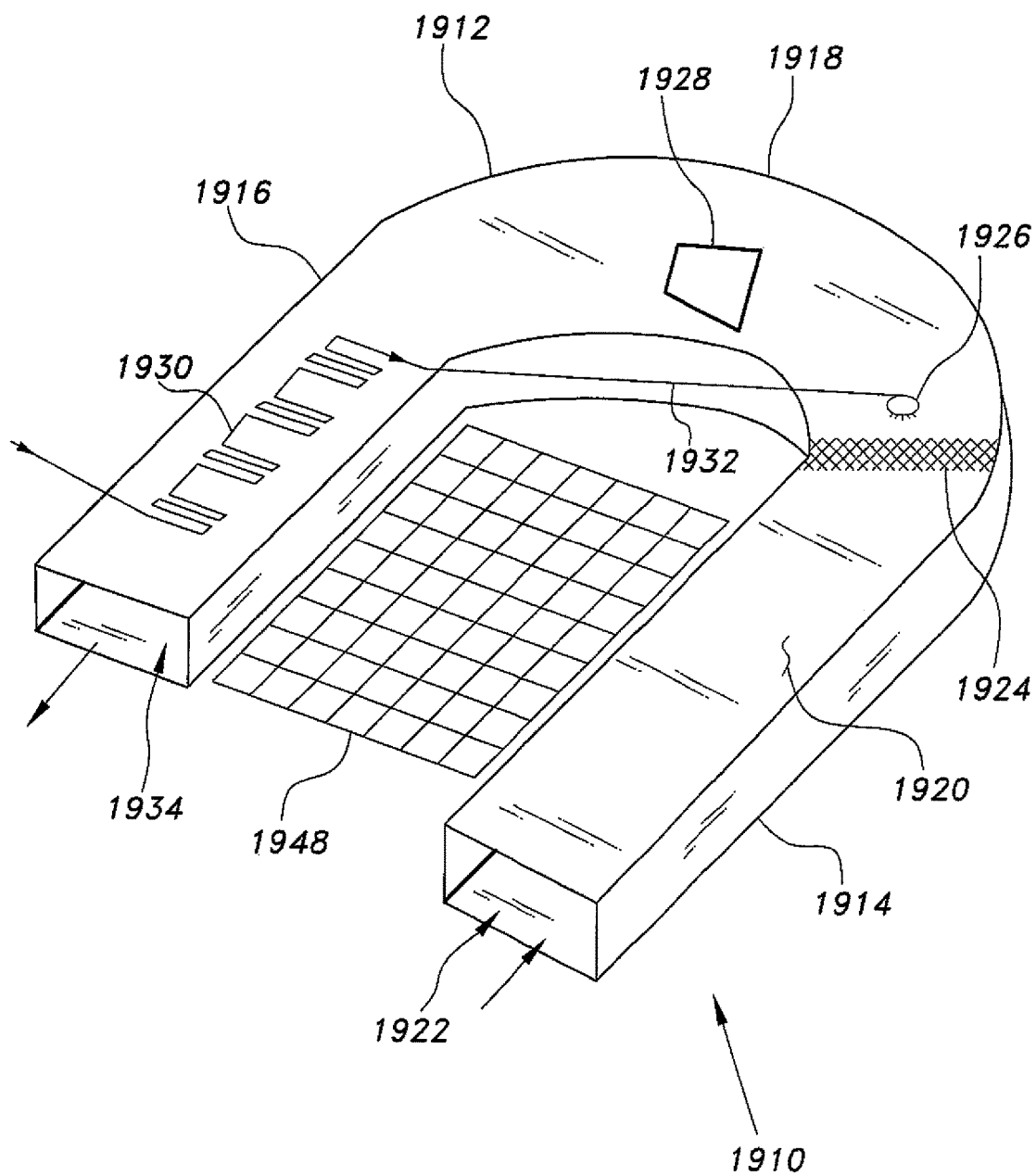
FIG. 19 is a schematic perspective view of the open carrier gas humidification-dehumidification desalination system of FIG. 15 with the addition of a photovoltaic panel to operate pumps.

FIG. 19 provides a schematic perspective view of the open carrier gas humidification-dehumidification desalination system of FIG. 15 with the addition of a photovoltaic panel to operate pumps. The humidification-dehumidification desalination system 1910 is similar to other embodiments, and particularly to the system 1510 of FIG. 15. The system 1910 has a housing 1912 defining a humidification section 1914 and a dehumidification section 1916 joined by an intermediate section 1918, an upper surface 1920 of the humidification section 1914 being transparent. Air (or other carrier gas) enters the open entrance or inlet 1922 of the humidification section 1914 and passes through a humidifier similar to those described in FIGS. 1-9. The humidifier may include a packing bed 1924 and/or sprayer 1926. The air or carrier gas then flows through a circulation device 1928 in the intermediate section 1918 and into the dehumidification section 1916, where it flows through a dehumidifier similar to those described in FIGS. 10A through 14. A series of coolant circulation tubes 1930 cools the liquid of the dehumidifier system in the dehumidification section 1916. The coolant from the circulation tubes 1830 may then flow through a transfer line 1932 to the sprayer 1926. The dehumidified air or gas exits the dehumidification section 1916 from its open exit or outlet 1934.

The humidification-dehumidification desalination system 1610 of FIG. 16 differs from the other humidification-dehumidification desalination systems described further above by having a photovoltaic panel 1948 installed therewith. The panel 1948 is electrically connected conventionally (wiring not shown) to provide electrical power to the circulation device 1928, and/or to other electrically powered components.

While several embodiments of the humidification-dehumidification desalination system are disclosed herein, it will be seen that there are many additional variations and embodiments that may be provided by combining various features and components of the embodiments specifically described herein. For example, any of the embodiments may operate using only a single liquid tray in the humidification section, the dehumidification section, or both. Conversely, a plurality of liquid trays other than the four trays generally shown and described herein may be provided. Two or more trays may be stacked vertically, this arrangement being suitable for any number of the staggered or stepped tray arrangements. The sprayer or sprayers may be incorporated with any of the humidification system embodiments, as desired. Similarly, the packing bed may be incorporated in any of the humidifiers. The use of a manifold to provide the incoming air or gas for the humidification system may be used with any of the embodiments. The various components of the combination humidification-dehumidification systems may be combined with other embodiments, e.g., the photovoltaic panel array. Other permutations and combinations of the various components and features may be constructed and assembled as desired.

The various embodiments of the humidification-dehumidification system may operate generally in one of four ways: (1) using an open air (or gas) cycle and a closed liquid cycle; (2) using an open air (or gas) cycle and an open liquid cycle; (3) using a closed air (or gas) cycle and a closed liquid cycle; or (4) using a closed air (or gas) cycle and an open liquid cycle. Also, any of the embodiments may provide for heating of the liquid and/or gas before, during, or after introduction of the liquid into the humidifier. The basic humidifier component of the system may be combined with dehumidifier systems using other principles of operation, and similarly, the basic dehumidifier component of the system may incorporate humidifier systems of other principles of operation. Alternatively, the humidifier and dehumidifier systems according to the present invention may be used separately from one another, as stand-alone systems. As an example, the humidifier system may provide for cooling air as it passes through the system, due to the cooling effect of evaporation of moisture into the air. It should also be noted that while the use of solar energy has been described to operate the various powered components of the system, the system may be operated at night or during periods of relatively low solar energy input by using other energy sources.

Although the system has been described as a desalination system, it may be used in any application where humidification-dehumidification (HDH) technology may be used, e.g., obtaining pure water from brackish water and waste water. Furthermore, the system may be used in the treatment of shale gas and flow-back water, or for separating water during the oil/natural gas fracturing process. Since the humidifier and the dehumidifier are modular, they may be used separately in processes that only require humidification or dehumidification. For example, the humidifier may be used in air conditioning or similar applications, or for cooling down water in cooling towers. Similarly, the stepped, multi-stage dehumidifier may be used to dehumidify the air in air dessicant or similar applications.

The stepped multi-stage humidifier may be used in HDH applications with the stepped, multi-stage dehumidifier described herein, or with any other conventional dehumidifier suitable for HDH applications. Similarly, the stepped, multi-stage dehumidifier may be used in HDH applications with the stepped, multi-stage humidifier described herein, or with any other conventional humidifier suitable for HDH applications. The basic stepped, multi-stage humidifier described in FIG. 1 may be used with any or all of the additions or variations described in FIGS. 2-5 and 8-9 in any desired combination. Similarly, the basic stepped, multi-stage dehumidifier described in FIG. 10A may be used with any or all of the additions or variations described in FIGS. 10B-14 in any desired combination.

It is to be understood that the present invention is not limited to the embodiments described above, but encompasses any and all embodiments within the scope of the following claims.

We claim:

1. A humidification-dehumidification desalination system, comprising:
   a humidifier having:
   a housing having a sloped roof, a carrier gas inlet, a carrier gas outlet, a liquid inlet, and a liquid outlet;
   at least one tray disposed in the housing, the tray being adapted for containing a liquid to be purified, the tray having a floor incorporating a bubble generator therein, the housing defining an inlet chamber below the at least one tray and an outlet chamber above the at least one tray, the carrier gas inlet opening into the inlet chamber and the carrier gas outlet opening from the outlet chamber, the liquid inlet being configured for introducing the liquid to be purified into the at least one tray, the liquid outlet being positioned so that excess liquid overflows the at least one tray to flow out of the housing through the liquid exit;
   a dehumidifier; and
   a carrier gas;

whereby the carrier gas may be introduced into the humidifier housing through the carrier gas inlet, humidified by bubbling through a pool of the liquid to be purified, and exit the humidifier through the carrier gas outlet, the humidified gas being condensed in the dehumidifier to produce purified water.

2. The humidification-dehumidification desalination system according to claim 1, wherein said dehumidifier comprises:

a housing having a sloped roof, a carrier gas inlet, a carrier gas outlet, and a purified liquid outlet;

an plurality of successively stepped liquid trays disposed within the housing, the trays being adapted for containing the purified liquid therein, each of the liquid trays having a floor incorporating a bubble generator therein, the housing defining an inlet chamber below the stepped trays and an outlet chamber above the stepped trays, the carrier gas inlet opening into the inlet chamber and the carrier gas outlet opening from the outlet chamber, the liquid trays ranging from an uppermost tray to a lowermost tray, each successively lower tray receiving overflow from the tray immediately above; and a plurality of coolant circulation tubes, each of the trays having a portion of a corresponding one of the tubes disposed in the tray, at least one of the tubes having a liquid inlet extending through the housing and at least one of the tubes having a liquid outlet extending through the housing;

whereby the humidified carrier gas may be introduced into the dehumidifier through the dehumidifier carrier gas inlet, pass through the bubble generator so that purified liquid condenses from the humidified carrier gas indirectly by passing the coolant circulation tubes in the trays and directly by bubbling through a pool of the purified liquid in the trays when sufficient purified liquid has collected in the trays, the purified liquid overflowing the lowermost one of the trays and exiting the dehumidifier through the purified liquid outlet.

3. The humidification-dehumidification desalination system according to claim 1, wherein said at least one tray in the humidifier comprises a plurality of successively stepped liquid trays disposed within the housing, the trays being adapted for containing the liquid to be purified therein, each of the liquid trays having a floor incorporating a bubble generator therein, the inlet chamber being defined below the stepped trays and the outlet chamber being defined above the stepped trays, the carrier gas inlet opening into the inlet chamber and the carrier gas outlet opening from the outlet chamber, the liquid trays ranging from an uppermost tray to a lowermost tray, each successively lower tray receiving overflow from the tray immediately above.

4. The humidification-dehumidification desalination system according to claim 3, wherein said carrier gas is selected from the group consisting of air, hydrogen, helium, and carbon dioxide.

5. The humidification-dehumidification desalination system according to claim 3, wherein said carrier gas is air.

6. The humidification-dehumidification desalination system according to claim 3, wherein said bubble generator is selected from the group consisting of a sieve plate, a wheel sparger, radial ring sparger, spider sparger, a floor having metal sparger tubes incorporated therein, and a perforated plate.

7. The humidification-dehumidification desalination system according to claim 3, wherein said humidifier further comprises a sprayer disposed above the uppermost tray for spraying droplets of the liquid to be purified into the flow of carrier gas above the uppermost tray to enhance humidification of the carrier gas.

8. The humidification-dehumidification desalination system according to claim 7, wherein said humidifier further comprises a packing bed disposed between said sprayer and said uppermost tray.

9. The humidification-dehumidification desalination system according to claim 3, wherein said humidifier further comprises a sprayer disposed above at least one of the trays below the uppermost tray, the sprayer atomizing liquid to be purified from the next higher tray in the stepped configuration.

10. The humidification-dehumidification desalination system according to claim 3, wherein the floor of at least one of the trays of said humidifier is sloped downward.

11. The humidification-dehumidification desalination system according to claim 3, wherein the carrier gas inlet of said humidifier comprises a carrier gas plenum having a plurality of inlet nozzles extending therefrom, each of the trays having a corresponding one of the inlet nozzles discharging the carrier gas into the inlet chamber below the tray.

12. The humidification-dehumidification desalination system according to claim 11, further comprising at least one partition wall disposed in the inlet chamber so that at least one of said inlet nozzles supplies said carrier gas to fewer than all of said trays.

13. The humidification-dehumidification desalination system according to claim 11, wherein said carrier gas plenum has a portion thereof heated by overflow of excess liquid from the lowermost tray in order to preheat the carrier gas.

14. The humidification-dehumidification desalination system according to claim 3, wherein the sloped roof of said humidifier has a transparent panel disposed therein for solar heating of the liquid to be purified and the humidified carrier gas in said outlet chamber.

15. The humidification-dehumidification desalination system according to claim 3, further comprising a sprayer disposed at the carrier gas inlet of said humidifier for spraying droplets of the liquid to be purified into the carrier gas.

16. The humidification-dehumidification desalination system according to claim 3, further comprising a supplemental tray disposed vertically above at least one of the successively stepped liquid trays in said humidifier, the supplemental tray having a floor incorporating a bubble generator therein.

17. The humidification-dehumidification desalination system according to claim 3, further comprising a heat exchange duct disposed at the liquid inlet of said humidifier for preheating the liquid to be purified.

18. The humidification-dehumidification desalination system according to claim 3, wherein said dehumidifier comprises:

a housing having a sloped roof, a carrier gas inlet, a carrier gas outlet, and a purified liquid outlet;

an plurality of successively stepped liquid trays disposed within the housing, the trays being adapted for containing the purified liquid therein, each of the liquid trays having a floor incorporating a bubble generator therein, the housing defining an inlet chamber below the stepped trays and an outlet chamber above the stepped trays, the carrier gas inlet opening into the inlet chamber and the carrier gas outlet opening from the outlet chamber, the liquid trays ranging from an uppermost tray to a lowermost tray, each successively lower tray receiving overflow from the tray immediately above; and a plurality of coolant circulation tubes, each of the trays having a portion of a corresponding one of the tubes disposed in the tray, at least one of the tubes having a liquid inlet extending through the housing and at least one of the tubes having a liquid outlet extending through the housing;

whereby the humidified carrier gas may be introduced into the dehumidifier through the dehumidifier carrier gas inlet, pass through the bubble generator so that purified liquid condenses from the humidified carrier gas indirectly by passing the coolant circulation tubes in the trays and directly by bubbling through a pool of the purified liquid in the trays when sufficient condensed purified liquid has collected in the trays, the purified liquid overflowing the lowermost one of the trays and exiting the dehumidifier through the purified liquid outlet.

19. The humidification-dehumidification desalination system according to claim 18, further comprising a supplemental tray disposed vertically above at least one of the successively stepped liquid trays in said dehumidifier, the supplemental tray having a floor incorporating a bubble generator therein.

20. The humidification-dehumidification desalination system according to claim 18, wherein the floor of at least one of the trays of said dehumidifier is sloped downward.

21. The humidification-dehumidification desalination system according to claim 18, wherein the carrier gas inlet of said dehumidifier comprises a carrier gas plenum having a plurality of inlet nozzles extending therefrom, each of the trays having a corresponding one of the inlet nozzles discharging the humidified carrier gas into the inlet chamber below the tray.

22. The humidification-dehumidification desalination system according to claim 18, wherein said dehumidifier further comprises a pool of cooled purified liquid disposed following the lowermost tray of said successively stepped liquid trays and adjacent the carrier gas outlet.

23. The humidification-dehumidification desalination system according to claim 18, wherein said dehumidifier further comprises a final bubble column stage separated from the plurality of successively stepped liquid trays, the final bubble column stage including a tray having a floor incorporating a bubble generator therein and a coolant circulation tube having a portion thereof disposed in the tray, the carrier gas outlet from said outlet chamber having a flow path extending therefrom to below the floor of the final bubble column stage, whereby all of the humidified carrier gas introduced into said dehumidifier pass through two stages of dehumidification.

24. The humidification-dehumidification desalination system according to claim 18, further comprising a first conduit connecting the carrier gas outlet of said humidifier with the carrier gas inlet of said dehumidifier and a second conduit connecting the carrier gas outlet of said dehumidifier with the carrier gas inlet of said humidifier, whereby the system is a closed loop carrier gas humidification-dehumidification desalination system.

25. The humidification-dehumidification desalination system according to claim 18, further comprising a first conduit connecting the liquid outlet of said humidifier with the inlet of at least one of the coolant circulation tubes of said dehumidifier and a second conduit connecting the liquid outlet of at least one of the coolant circulation tubes of said dehumidifier with the liquid inlet of said humidifier, whereby the system is a closed loop liquid humidification-dehumidification desalination system.

26. The humidification-dehumidification desalination system according to claim 18, at least one injection/extraction tube extending between said humidifier and said dehumidifier for exchange of fluid between said humidifier and said dehumidifier.

27. The humidification-dehumidification desalination system according to claim 18, further comprising a compressor connected to said dehumidifier for operation of said dehumidifier at higher pressure than said humidifier.

28. The humidification-dehumidification desalination system according to claim 18, further comprising a vacuum pump connected to said humidifier for operation of said humidifier under vacuum.

* * * * *